(12) United States Patent
Chakraborty

(10) Patent No.: US 10,104,671 B2
(45) Date of Patent: Oct. 16, 2018

(54) DEVICE AND METHOD FOR PERFORMANCE IMPROVEMENT WITH PLURALITY OF SUBSCRIBER IDENTITY MODULE AWARENESS

(71) Applicant: Intel IP Corporation, Santa Clara, CA (US)

(72) Inventor: Soumen Chakraborty, Bangalore (IN)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/182,701

(22) Filed: Jun. 15, 2016

(65) Prior Publication Data

US 2017/0367085 A1    Dec. 21, 2017

(51) Int. Cl.
| | |
|---|---|
| *H04W 24/10* | (2009.01) |
| *H04W 72/04* | (2009.01) |
| *H04W 36/00* | (2009.01) |
| *H04W 56/00* | (2009.01) |
| *H04W 68/02* | (2009.01) |
| *H04W 8/18* | (2009.01) |
| *H04W 88/06* | (2009.01) |
| *H04W 8/20* | (2009.01) |

(52) U.S. Cl.
CPC ......... *H04W 72/048* (2013.01); *H04W 8/183* (2013.01); *H04W 36/0072* (2013.01); *H04W 36/0094* (2013.01); *H04W 56/001* (2013.01); *H04W 68/02* (2013.01); *H04W 8/205* (2013.01); *H04W 24/10* (2013.01); *H04W 88/06* (2013.01)

(58) Field of Classification Search
CPC ... H04W 24/10; H04W 24/08; H04W 64/003; H04W 72/085; H04W 28/0231; H04W 64/00

USPC .............. 455/423, 450, 456.1, 507; 370/331, 370/395.2, 463

See application file for complete search history.

(56) References Cited

U.S. PATENT DOCUMENTS

| 5,490,250 A | * | 2/1996 | Reschke | ................. | H04L 69/40 |
| | | | | | 714/49 |
| 5,572,438 A | * | 11/1996 | Ehlers | .................. | G01R 21/133 |
| | | | | | 307/37 |
| 5,684,710 A | * | 11/1997 | Ehlers | .................. | G01R 21/133 |
| | | | | | 307/115 |

(Continued)

FOREIGN PATENT DOCUMENTS

| EP | 2302973 A1 | 3/2011 |
| GB | 2301733 A | 12/1996 |

OTHER PUBLICATIONS

The Extended European Search Report based on Application No. 17171430.6 (14 Pages) dated Jul. 25, 2017.

*Primary Examiner* — William D Cumming
(74) *Attorney, Agent, or Firm* — Viering, Jentschura & Partner mbB

(57) ABSTRACT

A wireless communication apparatus for a wireless communication system is described in one example comprising a receiver to receive communication signals, one or more processor to determine, based on the communication signals, that at least two SIM cards are located in one and the same wireless communication device of the wireless communication system, and the one or more processor further to coordinate requests for the at least two SIM cards that are located in the wireless communication device. Other embodiments may be described and/or claimed.

9 Claims, 9 Drawing Sheets

(56) References Cited

U.S. PATENT DOCUMENTS

| | | | | |
|---|---|---|---|---|
| 5,696,695 A * | 12/1997 | Ehlers | ............ | G01R 21/133 |
| | | | | 307/115 |
| 7,614,085 B2 * | 11/2009 | Ben-Itzhak | ............ | G06F 21/55 |
| | | | | 726/1 |
| 8,417,490 B1 * | 4/2013 | Preston | ............ | G06F 17/5095 |
| | | | | 701/114 |
| 8,552,903 B2 * | 10/2013 | Julian | ............ | H04W 64/00 |
| | | | | 342/118 |
| 9,226,191 B1 * | 12/2015 | Vivanco | ............ | H04W 28/0231 |
| 9,505,394 B2 * | 11/2016 | Falkenstein | ............ | B60K 6/48 |
| 9,519,536 B2 * | 12/2016 | Arora | ............ | G06F 11/079 |
| 2001/0010032 A1 * | 7/2001 | Ehlers | ............ | G05B 15/02 |
| | | | | 702/62 |
| 2005/0038881 A1 * | 2/2005 | Ben-Itzhak | ............ | G06F 21/55 |
| | | | | 709/223 |
| 2005/0213603 A1 * | 9/2005 | Karighattam | ............ | H04L 49/90 |
| | | | | 370/463 |
| 2007/0285306 A1 * | 12/2007 | Julian | ............ | G01S 13/765 |
| | | | | 342/118 |
| 2008/0062997 A1 * | 3/2008 | Nix | ............ | H04L 29/12066 |
| | | | | 370/395.2 |
| 2009/0323632 A1 * | 12/2009 | Nix | ............ | H04L 29/125 |
| | | | | 370/331 |
| 2012/0094703 A1 * | 4/2012 | Sasayama | ............ | H04W 24/10 |
| | | | | 455/507 |
| 2012/0109680 A1 * | 5/2012 | Shorrosh | ............ | G06Q 10/00 |
| | | | | 705/2 |
| 2012/0138405 A1 * | 6/2012 | Falkenstein | ............ | B60K 6/48 |
| | | | | 192/3.54 |
| 2012/0142335 A1 * | 6/2012 | Chiou | ............ | H04W 24/08 |
| | | | | 455/423 |
| 2013/0217408 A1 * | 8/2013 | DiFazio | ............ | H04W 64/003 |
| | | | | 455/456.1 |
| 2013/0298192 A1 * | 11/2013 | Kumar | ............ | G06F 21/52 |
| | | | | 726/3 |
| 2015/0289141 A1 | 10/2015 | Ghasemzadeh et al. | | |
| 2015/0327282 A1 * | 11/2015 | Werner | ............ | H04W 72/085 |
| | | | | 455/450 |
| 2016/0219648 A1 | 7/2016 | Awoniyi-Oteri et al. | | |
| 2017/0060810 A1 * | 3/2017 | Preston | ............ | G06F 17/50 |
| 2017/0118738 A1 * | 4/2017 | Axmon | ............ | H04W 68/005 |
| 2017/0367085 A1 * | 12/2017 | Chakraborty | ............ | H04W 36/0072 |

* cited by examiner

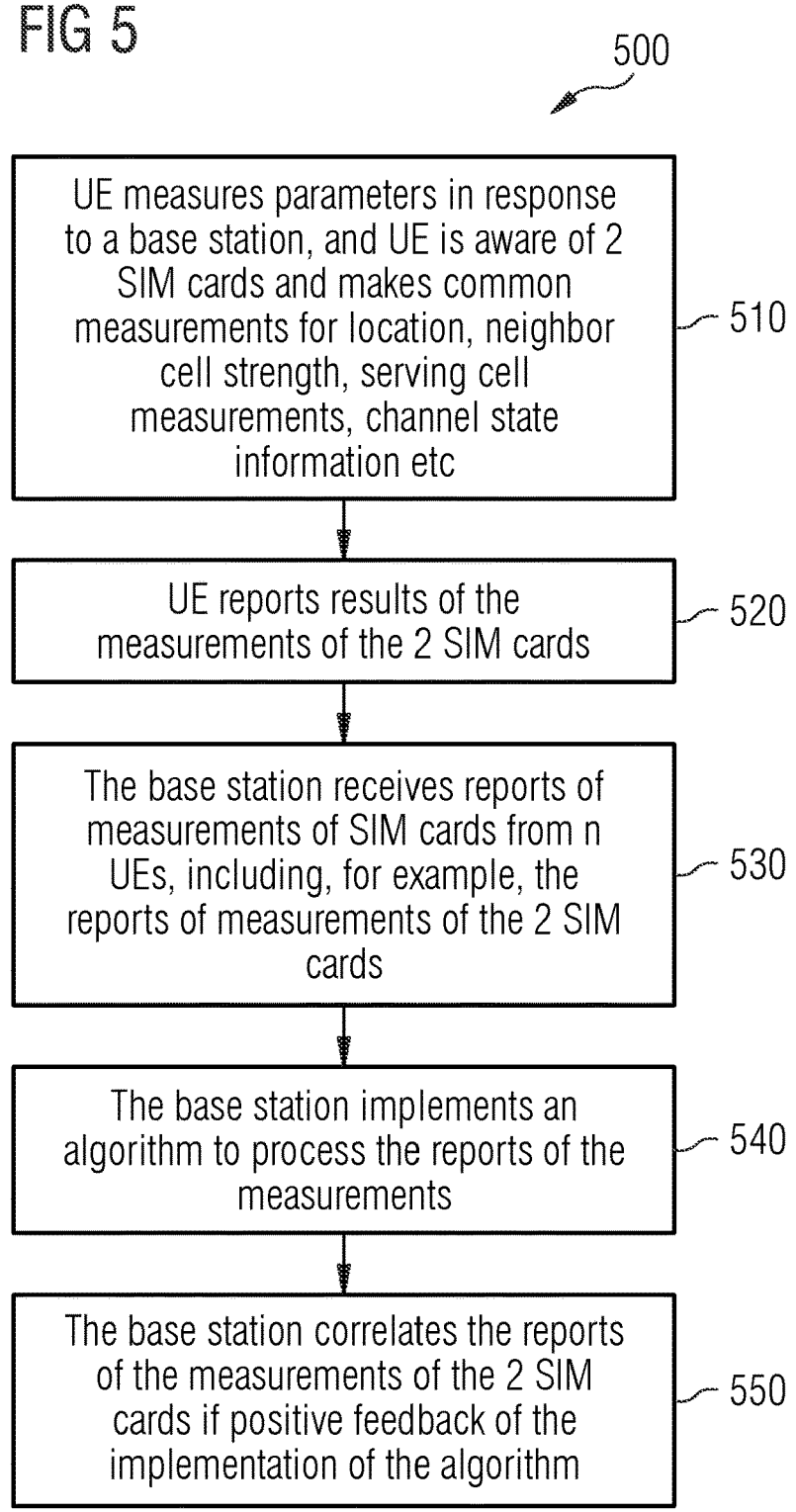

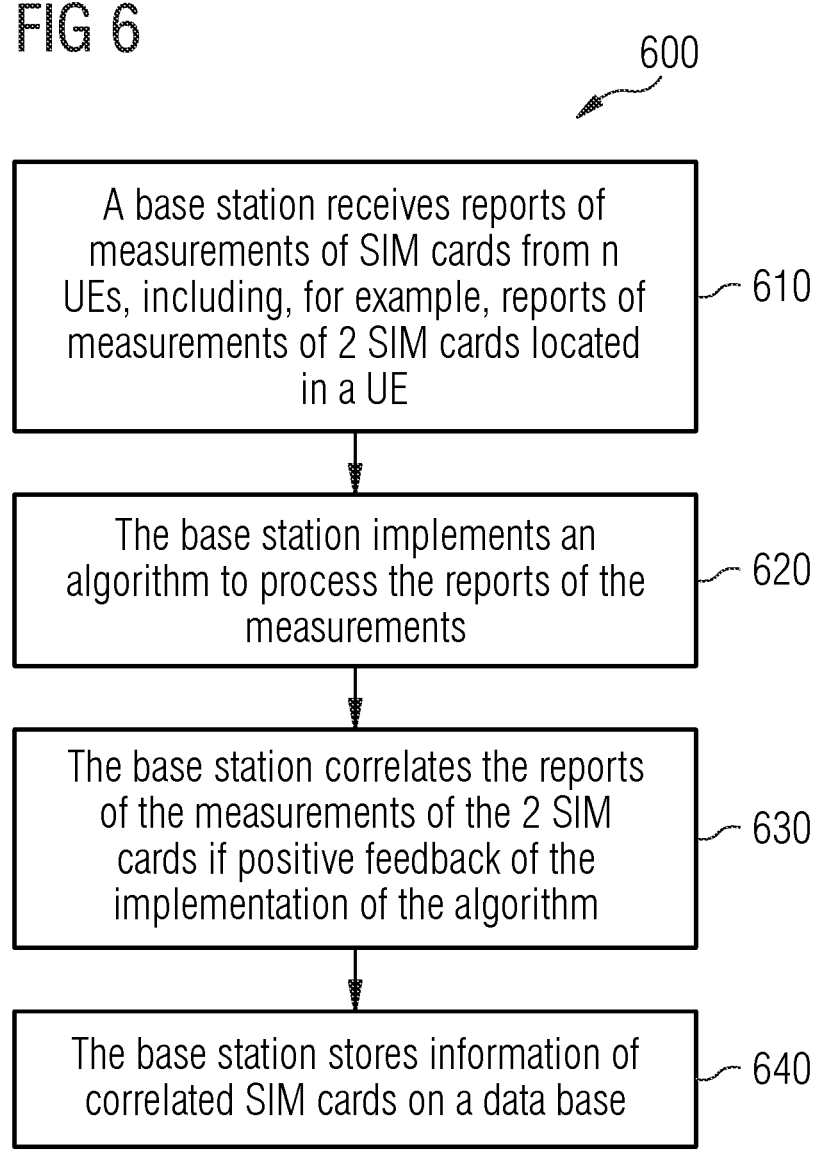

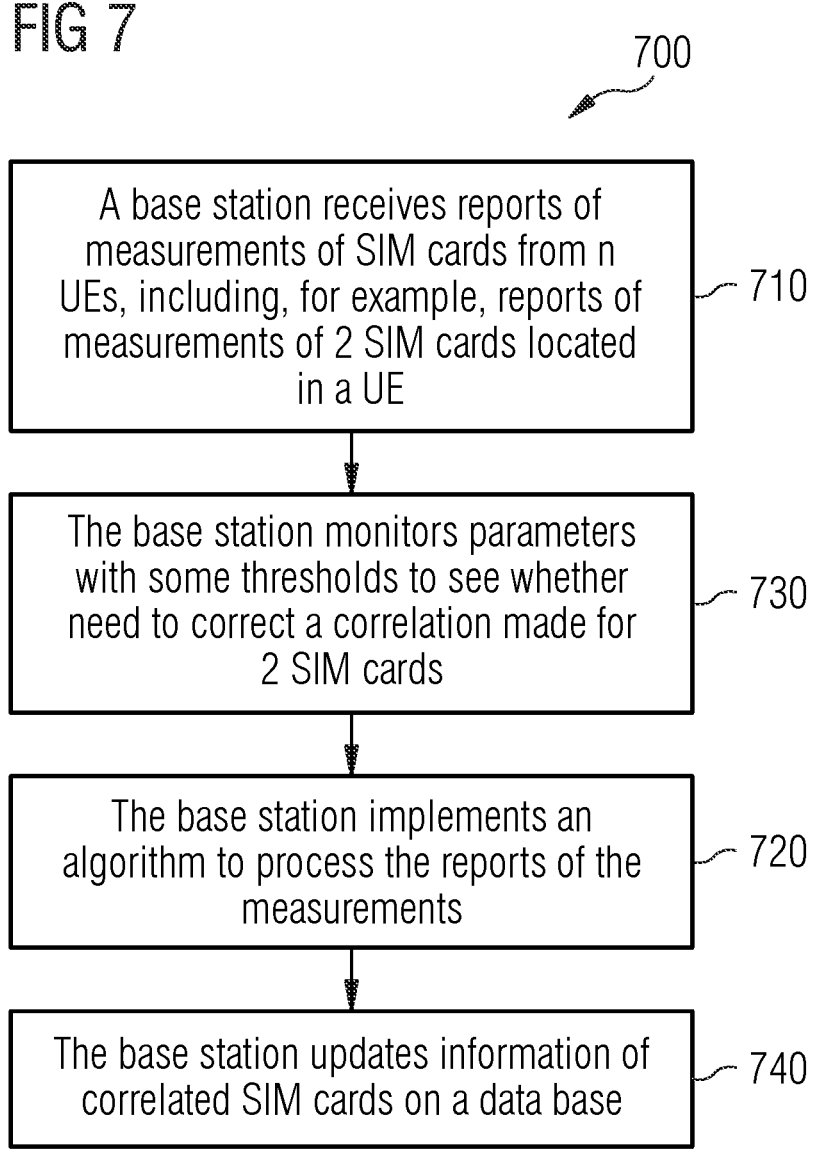

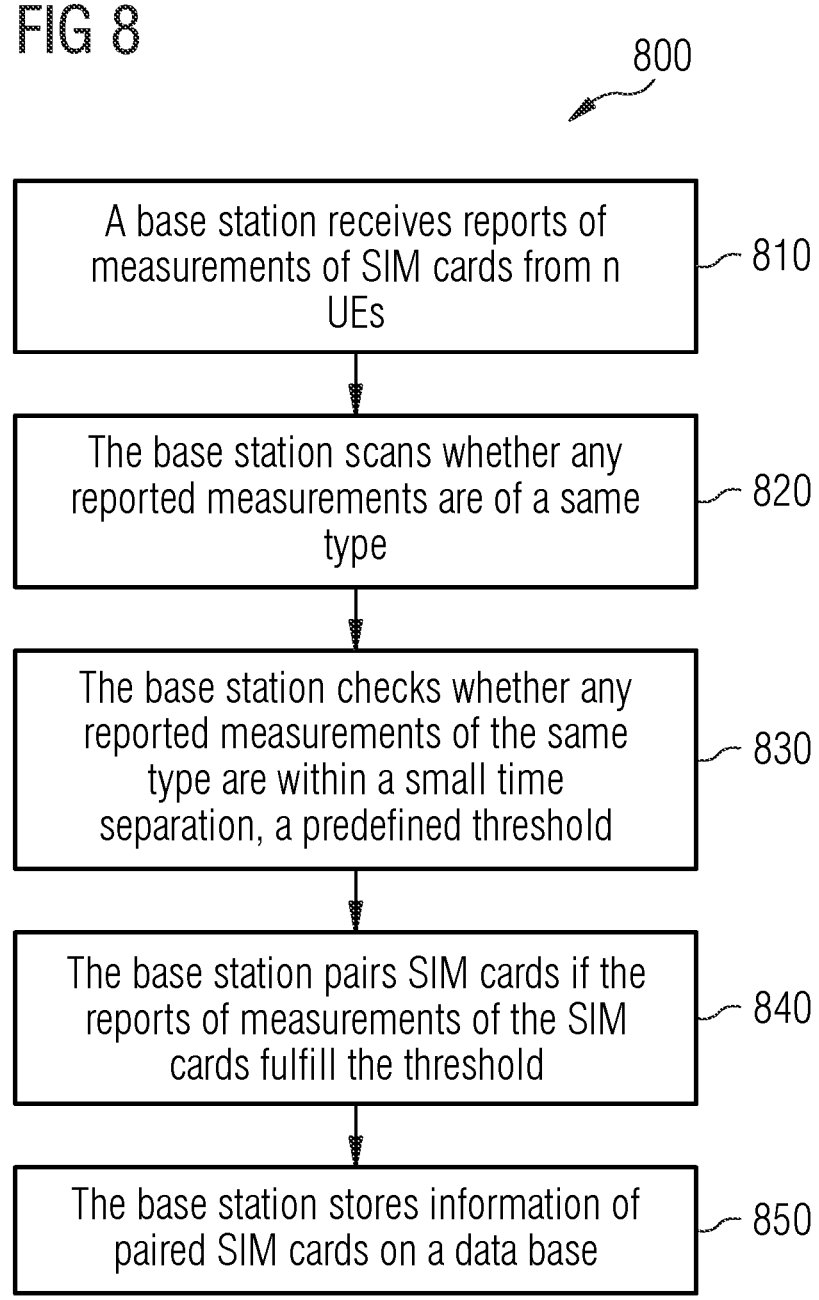

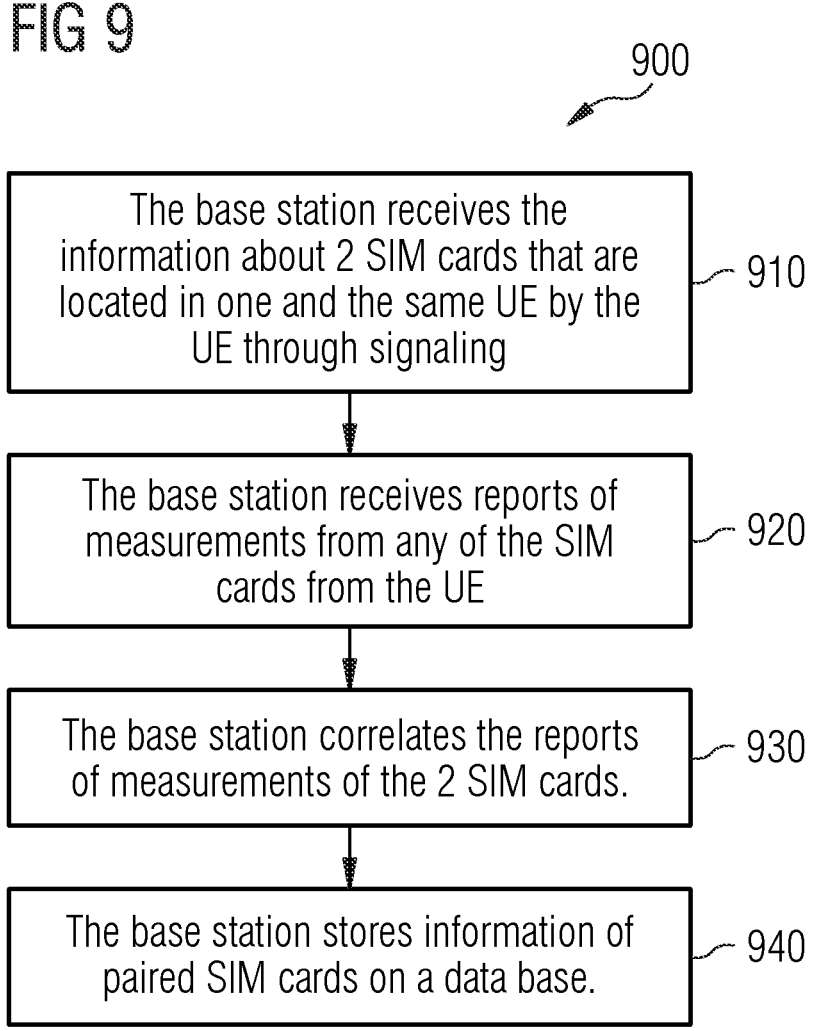

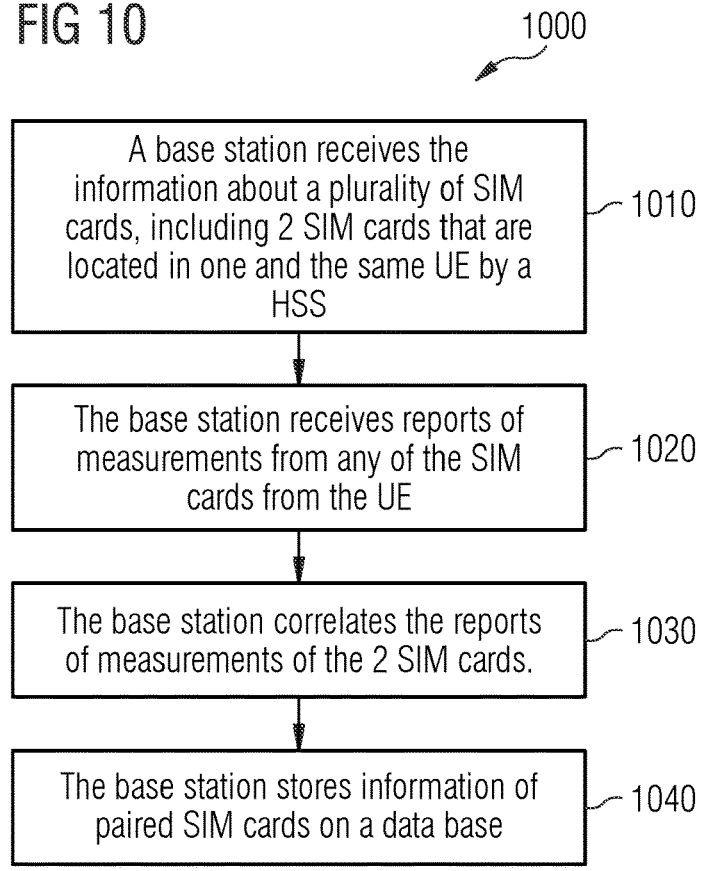
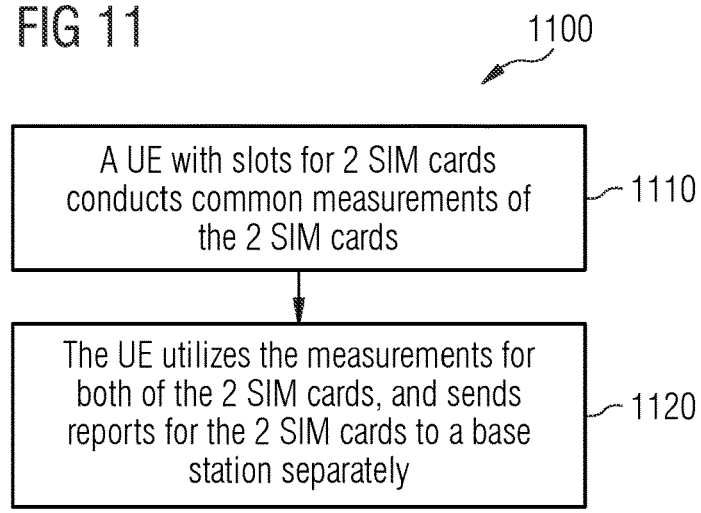

DEVICE AND METHOD FOR PERFORMANCE IMPROVEMENT WITH PLURALITY OF SUBSCRIBER IDENTITY MODULE AWARENESS

TECHNICAL FIELD

Embodiments described herein generally relate to wireless communication devices, methods, and systems for improving communication performance with plurality of Subscriber Identity Module (SIM) awareness.

BACKGROUND

Modern wireless communication devices may include slots for a plurality SIM cards to support advanced communications. For example, a wireless communication device that includes slots for two SIM cards is typically known as a dual SIM card wireless communication device. The device holds two numbers and two identities at once, receives and/or sends signal and/or data on either number. It allows, for example, easier roaming by being able to access a foreign network while keeping an existing local card. It allows, for example, separate numbers for personal and business uses on the same device. Wireless communication devices with plurality of SIM cards are applied for a variety of wireless communication systems from Global System for Mobile Communications (GSM), to Universal Mobile Telecommunication System (UMTS), to Long Term Evolution (LTE), and to $5^{th}$ Generation (5G). Performance improvement of wireless communication devices with plurality of SIM cards as well as of wireless communication systems may be desired for more efficient use of power and better performance of the devices, and enhanced utilization of air resources of the systems.

BRIEF DESCRIPTION OF THE DRAWINGS

In the drawings, like reference characters generally refer to the same parts throughout the different view. The drawings are not necessarily to scale, emphasis instead generally being place upon illustrating the principles of the invention. In the following description, various aspects are described with reference to the following drawings, in which:

FIG. 5 shows a flow diagram illustrating an example method for improving performance with awareness of plurality of SIM cards for a base station of a wireless communication system and a wireless communication device including slots for two SIM cards within the system in accordance with some embodiments.

FIG. 6 shows a flow diagram illustrating an example method for improving performance through a base station of a mobile radio cell of a wireless communication system communicating with a wireless communication device including slots for two SIM cards in accordance with some embodiments.

FIG. 7 shows a flow diagram illustrating a second example method for improving performance through a base station of a mobile radio cell of a wireless communication system communicating with a wireless communication device including slots for two SIM cards in accordance with some embodiments.

FIG. 8 shows a flow diagram illustrating an example of a base station of a mobile radio cell of a wireless communication system communicating with a wireless communication device including slots for two SIM cards in accordance with some embodiments.

FIG. 9 shows a flow diagram illustrating an example method for improving performance through information provided to a wireless communication system communicating with a wireless communication device including slots for two SIM cards in accordance with some embodiments.

FIG. 10 shows a flow diagram illustrating a second example method for improving performance through information provided to a wireless communication system communicating with a wireless communication device including slots for two SIM cards in accordance with some embodiments.

FIG. 11 shows a flow diagram illustrating an example method for improving performance with assistance of a wireless communication device including slots for two SIM cards in accordance with some embodiments.

SUMMARY

Figure 1:
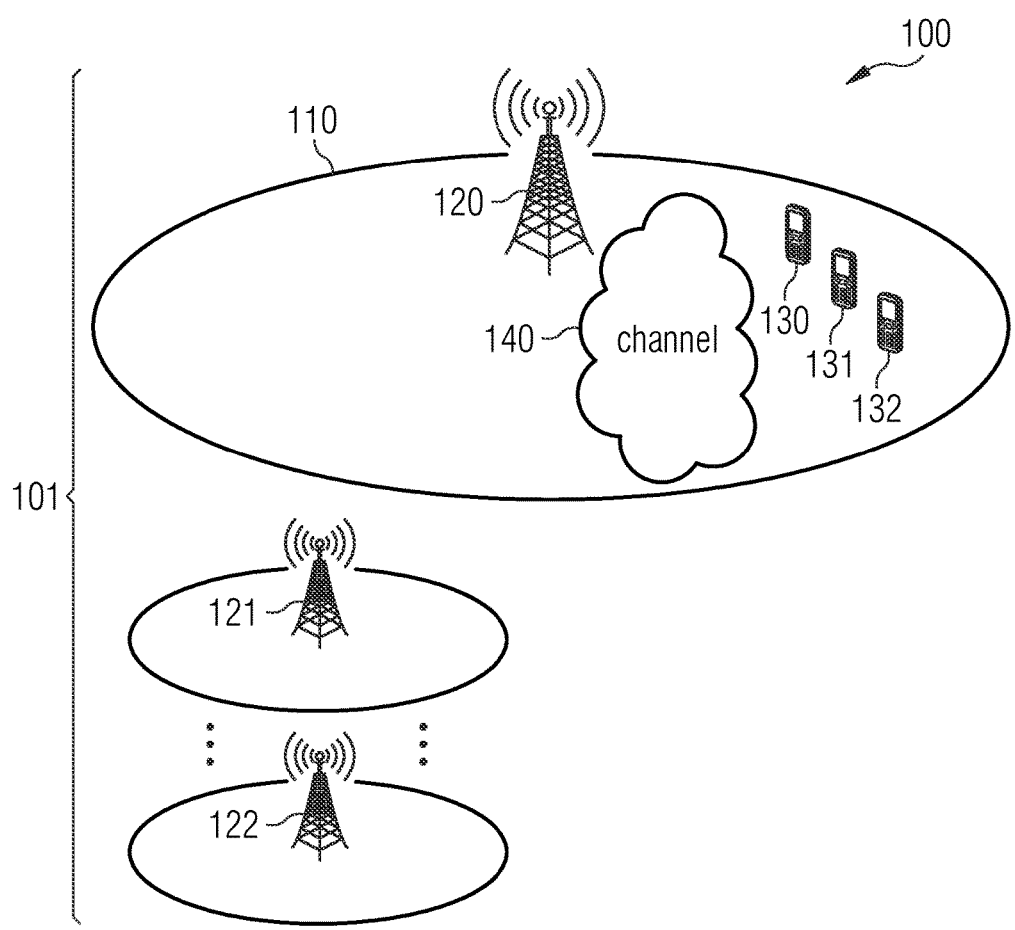
FIG. 1 shows a wireless communication system, for example, a GSM, an Enhanced Data Rates for GSM Evolution (EDGE), a UMTS, a LTE, or a 5G wireless communication system in accordance with some embodiments.

In a non-limiting embodiment, a wireless communication apparatus for a wireless communication system is described. The wireless communication apparatus may include a receiver and one or more processors. The receiver may receive communication signals. The processor(s) may determine that at least two SIM cards are located in one and the same wireless communication device of the wireless communication system based on the communication signals. The one or more processor(s) may further coordinate requests for at least two SIM cards that are located in the wireless communication device.

In another non-limiting embodiment, the apparatus of a wireless communication system may include a receiver, one or more processors, and a memory. The receiver may receive a plurality of measurement reports from a plurality of wireless communication devices of the wireless communication system. The memory may store recorded instructions thereof that when executed by the processor(s), may make the processor(s) to scan the plurality of measurement reports to identify a first set of reports that are of a same type, and to check the first set of reports to identify a second set of reports that are within a time separation less than a predefined threshold.

In another non-limiting embodiment, an apparatus for improving performance of wireless communications may include a receiving module and a processing module. The receiving module may receive a plurality of measurement reports from a plurality of wireless communication devices of a wireless communication system. The processing module may determine validity of correlated measurement reports of the plurality of measurement reports and correct the correlated measurement reports of the plurality of measurement reports if the correlated measurement reports of the plurality of measurement reports are determined to be invalid.

In another non-limiting embodiment, a processor for an apparatus to identify a plurality of Subscriber Identity Module (SIM) cards within a wireless communication device is described. The processor may scan a plurality of measurement reports of a plurality of wireless communication devices within a wireless communication system to identify a first set of reports that are of a same type. The processor may check the first set of reports to identify a second set of reports that are within a time separation less than a predefined threshold. The processor may correlate the second set of reports that are within the time separation. The processor may monitor parameters with thresholds to determine whether the correlated second set of reports needs to be corrected. The processor may correct the correlated second set of reports if the correlated second set of reports needs to be corrected.

DESCRIPTION OF EMBODIMENTS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

FIG. 1 shows a wireless communication system 100, for example, a GSM, an EDGE, a UMTS, or a LTE wireless communication system, or systems beyond LTE, for example, a 5G wireless communication system in accordance with some embodiments.

The wireless communication system 100, for example, a GSM, an EDGE, a UMTS, a LTE, or a 5G wireless communication system, includes a radio access network 101. The radio access network 101 may include base stations 120-122 (e.g. eNodeBs, eNBs, according to LTE). Each base station, for example, the base station 120 may provide radio coverage for one or more mobile radio cells, for example, mobile radio cell 110 of the radio access network 101.

A plurality of wireless communication devices 130-132, also referred to as mobile terminals, User Equipment (UEs), Mobile Stations (MS), mobile devices, receivers, transmitters, or transceivers, may be located in the mobile radio cell 110 of the wireless communication system 100. A wireless communication device, for example, wireless communication device 130 may communicate with other wireless communication devices, for example, wireless communication device 131 or 132 via a base station, for example, base station 120 providing coverage for (in other words, operating) the mobile radio cell, for example, mobile radio cell 110.

For radio communications via an air interface channel, for example, channel 140, a wireless communication device, for example, wireless communication device 130 may include a chain of Radio Frequency (RF) components, and a plurality of antennas, and a baseband processor. A chain of RF components which may also be referred to as an RF chain may include an RF receiver, an RF transmitter, or an RF transceiver. A plurality of antennas may form multiple antenna arrays. A baseband processor may include, for example, an analog baseband to provide analog signal processing, an Analog-to-Digital Converter (ADC) and Digital-to-Analog Converter (DAC) to provide conversions between the analog and digital domains, and a digital baseband to provide digital signal processing. A chain of RF components may be also a physical RF block that may process multiple parallel signals.

A wireless communication device, for example, wireless communication device 130 may include slots for a plurality of SIM cards. In some embodiments, the wireless communication device 130 includes slots for two SIM cards, also referred to as dual SIM wireless communication device 130. The dual SIM wireless communication device 130 may include an adapter to switch between the two SIM cards when required. The dual SIM wireless communication device 130 may include a chain of RF components shared by the two SIM cards. The device 130 may only able to send and/or receive signals and/or data on one SIM card at the time. The dual SIM wireless communication device 130 may allow the two SIM cards to be accessed through time multiplexing. The device 130 may lock to an active channel for sending and/or receiving signals and/or data, and ignore the other channel and thus make it unavailable during the duration of sending and/or receiving signals and/or data on the active channel. In some embodiments, the dual SIM wireless communication device 130 may include two chains of RF. Each of the two chains of RF may be capable of sending and/or receiving signals and/or data on both of the two SIM cards. However, battery consumption of the device 130 may increase.

The wireless communication device, for example, wireless communication device 130, may be within coverage of one or more mobile communication networks that may operate according to a same RAT (Radio Access Technology) or according to different RATs.

The radio access network 101 may support communications according to various communication technologies, e.g., mobile communication standards. Each base station, for example, base station 120, may provide a radio communication connection via an air interface channel, for example, channel 140, between the base station 120 and a wireless communication device, for example, wireless communication device 130, according to 5G, LTE, UMTS, GSM, EDGE radio access.

As described, a wireless communication device, for example, wireless communication device 130 may include slots for a plurality of SIM cards. Hereafter, for ease of illustration, embodiments for improving performance of wireless communication devices with slots for two SIM cards and wireless communication systems where the devices are located, or communicating with the devices, are described.

Figure 2:
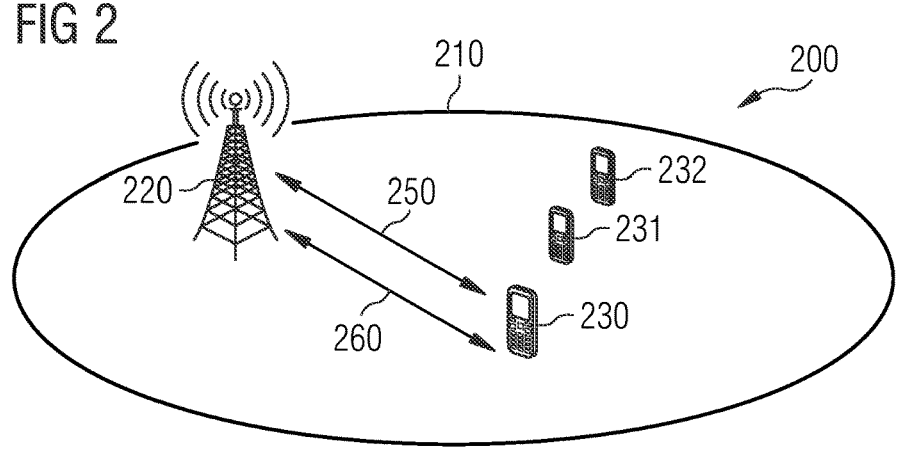
FIG. 2 shows an example of a wireless communication device including slots for two SIM cards within a wireless communication system in accordance with some embodiments.

FIG. 2 shows an exemplary scenario 200 of a wireless communication device including slots for a plurality of SIM cards, for example, wireless communication device 230 within a mobile radio cell, for example, mobile radio cell 210 of a wireless communication system, for example, wireless communication system 100 illustrated by FIG. 1. Although not explicitly shown in FIG. 2, the wireless communication device 230 may, for example, include slots for two SIM cards, for example, a first SIM card denoted as 250, and a second SIM card denoted as 260. A SIM card, for example, SIM card 250 or 260 is an integrated circuit chip that identifies and authenticates subscribers on a wireless communication device, for example, wireless communication device 230. The mobile radio cell 210 may include one or more base stations, for example, base station 220. The wireless communication system 100 illustrated by FIG. 1 may be, for example, a GSM, an EDGE, a UMTS, a LTE, or a 5G wireless communication system. According to the current procedure for communications between a wireless communication device and a base station, for example, between wireless communication device 230 and base station 220 defined by 3rd Generation Partnership Project (3GPP), the base station 220 may not be aware as to which SIM card is located in which wireless communication device, nor as to whether a plurality of SIM cards, for example, SIM cards 250 and 260 are located in one and the same wireless communication device, for example, wireless communication device 230.

Communications between a wireless communication device and a base station, for example, between wireless communication device 230 and base station 220, may include a variety of measurements that enable initiation or maintenance of communications amongst wireless communication devices, for example, wireless communication devices 230, 231, and 232, of a wireless communication system 100 as illustrated by FIG. 1. The base station 220 may command the wireless communication device 230 to do the variety of measurements on signals that correspond to each SIM card, for example, SIM card 250 and 260 that are located within the wireless communication device 230. The variety of measurements may include measurements of neighbor cells for handovers, for reselections, or for redirections, measurements of serving cells for Radio Link Monitoring (RLM), measurements of locations for location based services, measurements of Channel State Information (CSI) for link adaption in downlink transmission, measurements for cell search and decoding of Master Information Block (MIB) and System Information Blocks (SIBs) for Public Land Mobile Network (PLMN) search, etc. The measurements of neighbor cells for handovers, for reselections, or for redirections may include, for example, measurements of signal strength and signal quality of the neighbor cells. The measurements of serving cells for RLM may include, for example, measurements of signal strength and signal quality of the serving cells. The measurements of locations for location based services may include, for example, measurements of positioning reference signals, transmit-receive time differences, and serving cell strength. The measurements of CSI for link adaption in downlink transmission may include, for example, measurements of rank and channel quality. The measurements for cell search and decoding of MIB and SIBs may include, for example, cell search for detection of new cells, measurements of signal strength and quality of the cells, ranking the cells in the order of signal strength and reception of MIB and one or more SIBs on the cells. As described, the wireless communication device 230 may, for example, include slots for two SIM cards, for example, a first SIM card denoted as 250, and a second SIM card denoted as 260. In some embodiments, measurements that are commanded by the base station 220 and are to be conducted by the wireless communication device 230 may be duplicated, for example, in a handover scenario. Measurements on signals that correspond to one SIM card, for example, SIM card 250 of the wireless communication device 230, may be applicable, and hence, reused for the other SIM card, for example, SIM card 260 of the wireless communication device 230.

Therefore, if a base station, for example, base station 220 becomes aware that two SIM cards, for example, SIM cards 250 and 260 are located in one and the same wireless communication device, for example, wireless communication device 230, performance of the wireless communication device 230 as well as of the base station 220 may be improved. In some embodiments, if both of the SIM cards 250 and 260 are located in one and the same wireless communication device 230, the base station 220 may command the wireless communication device 230 to conduct common physical measurements on signals that correspond to one of the SIM cards, for example, SIM card 250 or 260, and send back reports of the measurements for the SIM card 250 or the SIM card 260 for functioning both of the SIM cards 250 and 260. The common physical measurements may include common measurements of neighbor cells for handovers, for reselection, or for redirection, common measurements of serving cells for RLM, common measurements of locations for location based services, common measurements of CSI for link adaptation in downlink transmission, common measurements for cell search and decoding of MIB and SIBs for PLMN search, etc. for functioning both of the SIM cards 250 and 260. With the common measurements, performance of the wireless communication device 230 as well as the base station 220 may be improved. The common measurements may be also considered as measurements of parameters that are conducted on signals that correspond to one SIM card, for example, SIM card 250 or 260, are utilized for both of the SIM cards 250 and 260. For example, power consumption may be more efficient at the wireless communication device 230 if the wireless communication device 230 conducts measurements only on signals that correspond to one SIM card, for example, SIM card 250 or 260. For example, air resources may be utilized in a more enhanced manner by the base station 220, and within the wireless communication system 100 illustrated by FIG. 1 if reports of measurements for only one SIM cards, for example, SIM card 250 or 260 are transmitted once for both of the SIM cards 250 and 260.

One example of improvement of performance may be achieved through alignments of paging cycles in Idle state of Radio Resource Control (RRC). For example, length of each of the paging cycles may be the same, or may be multiples of each other. This may mean that paging occasions overlap, or are within a few milliseconds of each other. With alignments of paging cycles, a wireless communication device may not need to independently power up to receive every individual paging message.

For example, improvement of performance may be achieved through alignments of Discontinuous Reception mode (DRX) in a connected state of RRC. Length of DRX cycles may be the same, or may be multiples of each other, and hence, DRX ON durations may overlap, or may be within a few milliseconds of each other.

For example, improvement of performance may be achieved through alignments of paging cycle of a first SIM card, for example, SIM card 250 in Idle mode with DRX cycle of DRX mode of a connected state of RRC of a second SIM card, for example, SIM card 260. This may mean that length of the paging cycle and the DRX cycle are the same or multiples of each other, and a DRX ON duration overlaps with a paging occasion, or the DRX ON duration and the paging occasion are within a few milliseconds of each other.

A second example of improvement of performance may be achieved through synchronizations of handovers of two SIM cards, for example, SIM cards 250 and 260 located within one wireless communication device, for example, wireless communication device 230. For example, when handovers of the two SIM cards 250 and 260 are to proceed between a same set of cells, the wireless communication device 230 may apply some of the procedures according to 3GPP for a handover as a set of common procedures for both of the SIM cards 250 and 260. For example, during a handover, the wireless communication device 230 may be commanded to acquire timing of a target cell to which the wireless communication device 230 hands over, including doing frequency synchronization, acquiring MIB, and acquiring SIBs. This procedure of timing synchronization, frequency synchronization, MIB acquisition or SIB acquisition may be considered as one of the common procedures for both of the SIM cards 250 and 260.

A third example of improvement of performance may be achieved through common measurements of neighbor cells for handovers, for reselections, or for redirections, common measurements of serving cells for RLM, common measurements of locations for location based services, common measurements of CSI for link adaption in downlink transmission, common measurements for cell search and decoding of MIB and SIBs for PLMN search, etc. The common measurements may be configured for a first SIM card, for example, SIM card 250 and a base station, for example, base station 220 may use the common measurements for both of the SIM cards 250 and 260. Moreover, measurement reports may not need to be sent separately for the two SIM cards 250 and 260. Instead, only one measurement report may be sent once for both of the SIM cards 250 and 260.

Without assistance from the base station 220, for example, without the base station 220 being aware of plurality of SIM cards within one wireless communication device, only some of physical layer measurements may be shared between two SIM cards, for example, SIM cards 250 and 260 that are located in one wireless communication device, for example, wireless communication device 230. Even though all these type of measurements, for example, measurements of neighbor cells for handovers, for reselections, or for redirections, measurements of serving cells for RLM, measurements of locations for location based services, measurements of CSI for link adaption in downlink transmission, measurements for cell search and decoding of MIB and SIBs for PLMN search, etc. may be shared between the two SIMs 250 and 260, the wireless communication device 230 may not be able to avoid all duplicated measurements without assistance from the base station. When configurations for the two SIM cards 250 and 260 are uncoordinated, the periodicity of required measurements, and the quantity to be measured on each of the SIM card 250 or 260, may be different, and this may require the wireless communication device 230 to do duplicated measurements. The measurement periodicity and the exact occasion for measurements may also depend on paging cycles in RRC Idle state, and DRX cycles in RRC Connected state, therefore, if paging configurations and DRX configurations are not coordinated, there may be little that could be done in power and performance improvement through common measurements. Although power and performance improvement may be achieved, the power and performance achieved are less than those when the base station 220 is aware that the two SIM cards 250 and 260 are located in one and the same wireless communication device 230. Therefore, performance improvement with awareness of plurality of SIM cards at wireless communication device side, at base station side, or at wireless communication system side may be desired.

Table 1 shown below may exhibit a number of areas that may be improved with awareness of plurality of SIM cards, for example, SIM cards 250 and 260, at wireless communication device side, for example, at wireless communication device 230 side, or at wireless communication system side, for example, at wireless communication system 100 side, as illustrated by FIG. 100. For a first example, power consumption of the wireless communication device 230 may decrease. For a second example, latency may be reduced to complete all the physical layer measurements at the wireless communication device 230 side. For a third example, usage of air resources of wireless communication system 100, for example, bandwidth of a radio access network 101 of the wireless communication system 100 illustrated by FIG. 1, may be improved.

Moreover, Table 1 shown below may also exhibit a number of procedures corresponding to the number of areas that are improved with awareness of plurality of SIM cards. For a first example, the procedures may include alignments of DRX in a connected state of RRC, alignments of paging cycles in idle state of RRC, and alignments of DRX in a connected state of RRC in one SIM card, for example, SIM card 250 or 260, with paging cycle in idle state of RRC in the other SIM card, for example, SIM card 260 or 250. For a second example, the procedures may include synchronizations of handovers, reselections, or redirections for two or more SIM cards. For a third example, the procedures may include common measurements of neighbor cells for handovers, for reselections, or for redirections, common measurements of serving cells for RLM, common measurements of locations for location based services, common measurements of CSI for link adaption in downlink transmission, common measurements for cell search and decoding of MIB and SIBs for PLMN search, etc. For a fourth example, the procedures may include sharing of PLMN measurements.

TABLE 1

Performance Improved with Plurality SIM Awareness

Assumptions:
2 SIMs are connected to the same eNB
Where ever applicable DRX cycle is 1280 ms

| Procedure | Power save (%) | | Latency reduction (%) | | Over the air resource optimization (Sending reports for one SIM only) | |
|---|---|---|---|---|---|---|
| | With eNB assistance | Without eNB assistance | With eNB assistance | Without eNB assistance | With eNB assistance | Without eNB assistance |
| Alignment of Paging cycles in RRC Idle | 30% | None | None | None | None | None |
| Alignment of connected mode DRX | 30% | None | None | None | None | None |
| Synchronization of handovers from 2 SIMs | 50% | None | 50% | None | None | None |
| Common neighbour cell measurements | 50%* | 20-30%* | 50% | 30% | YES | None |
| Common CSi measurements | 50%* | 20-30%* | None | None | YES | None |
| Common Location measurements | 50%* | 20-30%* | 50% | 30% | YES | None |
| Common RLM procedures | 50%* | 20-30%* | None | None | YES | Notre |
| Sharing of PLMN measurements | 50%* | 50% | 50% | 50% | None | None |

Notes:
*50% with respect to power consumption caused the procedure, not 50% of the over all use case
Assuming mismatch in periodicity due to configurations happening independently, different DRX cycles etc As described, measurements may be improved through assistance of a base station, for example, base station 220. The base station 220 may schedule a wireless communication device, for example, wireless communication device 230, with two SIM cards that are connected to the base station 220, for example, SIM cards 250 and 260, to conduct measurements on signals that correspond to one of the two SIM cards, for example, SIM card 250 or SIM card 260. In sharing common measurements of neighbor cells for handovers, for reselections, or for redirections, common measurements of serving cells for RLM, common measurements of locations for location based services, common measurements of CSI for link adaption in downlink transmission, common measurements for cell search and decoding of MIB and SIBs for PLMN search, etc., power saving of around 50% for the wireless communication device 230 may be achieved as shown in Table 1. Further, with the assistance of the base station 220, for example, if the base station 220 is aware of plurality of SIM cards, for example, SIM cards 250 and 260, located in one wireless communication device, for example, wireless communication device 230, configurations may be coordinated to avoid duplication of measurements and other duplicated procedures such as power-up to decode paging messages in idle mode of RRC, or power-up to send and/or receive data in ON duration of RRC connected mode of RRC. The configurations may further include, for example, paging cycle, paging occasion, DRX cycles, DRX ON durations, frequencies and cell indices of neighbor cells, measurement bandwidth for neighbor cells, measurement reporting periodicities, CSI reporting periodicities, measurement bandwidth of serving cells, etc. Through coordinating configurations, measurement periods, measurement occasions, and reporting periods for each of the two SIM cards 250 and 260 may be made the same, and measurement and reporting may even be configured into one for anyone of the SIM cards 250 or 260 so that power consumption at the wireless communication device 230 side may be reduced, for example, by about 50% as shown in Table 1. A lower amount of power and latency improvement may be possible at the wireless communication device 230 side even without assistance from the base station 220 as shown in Table 1. However, the improvement may be less than that with assistance from the base station 220, as the configurations for the two SIM cards 250 and 260 may need to be made independently. Furthermore, with the assistance of the base station 220, air resources of the wireless communication system 100 illustrated by FIG. 1 may be utilized more efficiently if the wireless communication device 230 only needs to send one report for the two SIM cards 250 and 260 that are located in the wireless communication device 230 to the base station 220. For example, the wireless communication device 230 with two SIM cards 250 and 260 may only need to send one report to the base station 220 for any one of the two SIM cards 250 and 260**. This may mean as well, usage of air resources may be halved. The report may include measurements, for example, measurements of neighbor cells for handovers, for reselections, or for redirections, measurements of serving cells for RLM, measurements of locations for location based services, or measurements of CSI for link adaption in downlink transmission, etc.

In some embodiments, a base station, for example, base station 220, of a wireless communication system, for example, wireless communication system 100 illustrated by FIG. 1, may process a plurality of reports of measurements it receives. The plurality of reports of measurements may include reports of measurements that contain information relevant to SIM cards 250 and 260 that connect to the base station 220, and are located within a one and the same wireless communication device, for example, wireless communication device 230. As described, communications amongst wireless communication devices may be made via base stations of wireless communication systems. As shown in FIG. 2, each wireless communication device, for example, wireless communication device 230, may communicate back and forth with one or more base stations, for example, base station 220, of a wireless communication system, for example, wireless communication system 100 illustrated by FIG. 1. The communications between the wireless communication device 230 and the base station 220 may include reports of measurements from the wireless communication device 230 for the SIM cards, for example, SIM cards 250 and 260 that are located within the wireless communication device 230. The measurements may include measurements of neighbor cells for handovers, for reselections, or for redirections, measurements of serving cells for RLM, measurements of locations for location based services, or measurements of CSI for link adaption in downlink transmission, etc. of the two SIM cards 250 and 260. The base station 220 may process the reports of the measurements according to definitions of 3GPP to enable communications for the wireless communication device 230 with other wireless communication devices, for example, wireless communication devices 231 and 232 of the wireless communication system 100 illustrated by FIG. 1. In addition, according to some embodiments, the base station 220 may process the plurality of reports of measurements it receives, identify and determine as to whether the two SIM cards 250 and 260 are located in one and the same wireless communication device 230, and correlate the reports of the measurements that are associated with both of the SIM cards 250 and 260.

In some embodiments, with the knowledge of two SIM cards 250 and 260 located in the same wireless communication device 230, the base station 220 may only need to trigger all functions for one of the SIM cards, for example, SIM card 250 or SIM card 260, and functions that are necessary for communications for the other SIM cards, for example, SIM card 260 or SIM card 250 may be triggered as well. Furthermore, the base station 220 may also correct the identification of the two SIM cards 250 and 260 within the wireless communication device 230 if the identification is invalid. In some embodiments, the correction may be conducted through monitoring packet errors. For example, if packet errors increase while using CSI measurements of one of the SIM cards, for example, SIM card 250, to schedule the other SIM card, for example, SIM card 260, this may mean the identification may be invalid. The base station 220 may dismiss the identification, and process for a second time to correlate the reports of the measurements representing both of the SIM cards 250 and 260 to generate a new identification as to whether the two SIM cards 250 and 260 are located in one and the same wireless communication device 230. For identifying for the second time, the reports of the measurements from both of the SIM cards 250 and 260 may be the same as the ones used for identifying for the first time. For identifying for the second time, the reports of the measurements from both of the SIM cards 250 and 260 may be different from the ones used for the first time. In some embodiments, the correction may be conducted through monitoring handover failures. For example, if handover failures exist while using neighbor cell measurements of one of the two SIM cards, for example, SIM card 250, to trigger a handover on both of the SIM cards 250 and 260, this may mean the identification may be invalid. As described, a new identification as to whether the two SIM cards 250 and 260 are located in one and the same wireless communication device 230 may be generated for a second time.

In some embodiments, a process may include a base station, for example, base station 220 receiving a plurality of measurement reports of different types from n wireless communication devices (n≥1, with n being an integer), for example, wireless communication device 230. The base station 220 may, for example, scan the plurality of measurement reports as to whether any of the reported measurements belong to a same type. The base station 220 may, for example, check the measurement reports of the same type as to whether any reported measurements of the same type is within a threshold for any two users, for example, two wireless communication devices. A threshold may be a pre-defined number; however, other thresholds may also apply. The base station 220 may determine, for example, two SIM cards, for example, two SIM cards 250 and 260, are located in one and the same wireless communication device, for example, wireless communication device 230, if all reported measurements of the same type, and reported within a time separation, are within a threshold. The base station 220 may, for example, correlate the measurement reports of the same type and are reported within the time separation. The base station 220 may, for example, further correlate the two SIM cards 250 and 260 that are associated with the measurement reports of the same type and are reported within the time separation. The correlation of two SIM cards 250 and 260 may be considered that the base station 220 may pair users related to the two SIM cards 250 and 260, for example, measurement reports of the two SIM cards 250 and 260 may be compared. Furthermore, the base station may store information of paired SIM cards 250 and 260, or information of correlated measurement reports of the SIM cards 250 and 260 on a database for imminent or future usage. This information may be monitored and corrected if it is found invalid. This information may be also updated on the database if it is corrected.

The base station 220 may include a receiver to receive a plurality of measurement reports from n wireless communication devices (n≥1, with n being an integer), for example, wireless communication device 230. The base station 220 may include a first memory to store the received measurement reports. The base station 220 may include a processor to decode the received measurement reports, and to conduct measurements on signals received. The base station 220 may further include a second memory to store information of previous correlations on a database. The base station may include a transmitter to send configurations to the wireless communication device 230 over the air.

In some embodiments, a wireless communication device, for example, wireless communication device 230, of a wireless communication system, for example, wireless communication system 100 illustrated by FIG. 1, may send an explicit signaling to a base station, for example, base station 220. Through the explicit signaling, the wireless communication device 230 may indicate the base station 220 that both of the two SIM cards 250 and 260 are located in the wireless communication device 230, i.e. in one and the same wireless communication device 230. As described, with the knowledge of the two SIM cards 250 and 260 located in the same wireless communication device 230, the base station 220 may be able to improve performance at the wireless communication device 230 side, and as well as at the base station 220 side.

The wireless communication device 230 may include a transmitter to send the explicit signaling to the base station 220, and to send measurement reports to the base station 220. The wireless communication device 230 may further include a receiver to conduct all measurements, for example, in response to a command of the base station 220. The base station 220 may also include a processor to conduct measurements on signals received, to utilize the measurements conducted on signals that correspond to one SIM card, for example, SIM card 250, for the other SIM card, for example, SIM card 260, and to generate measurement reports for both of the SIM cards 250 and 260. The base station 220 may, for example, include one or more memories to store all measurement results.

In some embodiments, Home Subscriber Server (HSS) may obtain information about International Mobile Subscriber Identity (IMSI) and International Mobile Equipment Identity (IMEI). In general, the HSS is a database that contains user-related and subscriber-related information. It also provides support functions in mobility management, for example, call and session setup, user authentication, and access authorization. It is defined based on Pre-3GPP Release 4 (Home Location Register (HLR) and Authentication Centre (AuC)). For example, IMSI may be used to identify a SIM card, for example, SIM card 250 or 260, within a wireless communication device, for example, wireless communication device 230, of a wireless communication system, for example, wireless communication system 100 illustrated by FIG. 1. For example, IMEI may be used to identify a wireless communication device, for example, wireless communication device 230, within a wireless communication system, for example, wireless communication system 100 illustrated by FIG. 1. HSS may inform a base station, for example, base station 220, of a wireless communication system, for example, wireless communication system 100 illustrated by FIG. 1, about as to whether two IMSIs, for example, IMSIs corresponding to SIM cards 250 and 260, are associated with a one and the same IMEI, for example, an IMEI corresponding to wireless communication device 230. As described, with the knowledge of the two SIM cards 250 and 260 located in the same wireless communication device 230, the base station 220 may be able to improve performance at the wireless communication device 230 side, and as well as at the base station 220 side.

The base station 220 may include wired connections to receive messages from the HSS. The wired connections may include fiber optics cables of an Ethernet link. Other wired connections may be also used. As described, the base station 220 may further include a receiver, one or more memories, a processor, and a transmitter to support all necessary procedures for performance improvement.

For example, with the knowledge of two SIM cards 250 and 260 located in the same wireless communication device 230, the base station 220 may be able to align paging cycles and Connected DRX for the two SIM cards 250 and 260. For example, the paging cycles may be configured in RRC Idle mode for the wireless communication device 230 to monitor paging messages. Typical paging cycles may be 320 ms, 640 ms 1280 ms, etc. For example, in RRC Connected mode, DRX cycles may allow the wireless communication device 230 to have discontinuous receptions, for example, to monitor downlink and uplink grants only during a periodic ON duration. Alignment of paging cycles between the two SIM cards 250 and 260, and Connected DRX cycles between the two SIM cards 250 and 260 may make it possible to have a common overhead of modem warm-up and modem cool-down times of the wireless communication device 230 for configuring both of the SIM cards 250 and 260. The wireless communication device 230 may not need to warm up nor cool down for each individual SIM card 250 or 260 separately.

For a wireless communication device, for example, wireless communication device 230, modem warm-up before a paging occasion or before an ON duration of RRC Connected mode DRX may burn power. Similarly, after end of a meaningful reception during the paging occasion or the ON duration, it may take a certain amount of time to power down all the components in the modem, and the wireless communication device 230 may burn power during this period of time. If paging occasions in RRC Idle mode, and in RRC Connected mode DRX ON duration are aligned for both the SIM cards, for example, SIM cards 250 and 260, the modem warm-up may be common for both the SIM cards 250 and 260. Similarly, if ends of meaningful receptions are aligned for both the SIM cards 250 and 260, the modem cool-down procedure may be common. Therefore, alignment of paging cycles and Connected DRX for the two SIM cards 250 and 260 may save power for the wireless communication device 230 where the two SIM cards 250 and 260 are located.

For example, with the knowledge of two SIM cards 250 and 260 located in the same wireless communication device 230, the base station 220 may be able to align handovers and reselections of the two SIM cards 250 and 260 within the wireless communication device 230. As shown in FIG. 2, both of the SIM cards 250 and 260 may be handed over to a same target cell together. A target cell may be considered as a mobile radio cell to which a wireless communication device, for example, wireless communication device 230, moves from a mobile radio cell where the wireless communication device 230 currently locates. The alignment of handovers and reselections of the two SIM cards 250 and 260 within the wireless communication device 230 may achieve, for example, common frame synchronizations within the target cell, common Master Information Block and System Information Block (MIBSIB) acquisitions, and common Rand Access (RA) procedure in case of handovers. These procedures are common for both of the SIM cards 250 and 260. If they are not duplicated for both of the SIM cards 250 and 260, the procedures may be completed faster for both of the SIM cards 250 and 260. This may help in reducing handover latency, and consuming less power.

For example, with the knowledge of two SIM cards 250 and 260 located in the same wireless communication device 230, the base station 220 may be able to move the two SIM cards 250 and 260 to a same frequency within the base station 220. According to 3GPP, a typical base station, for example, base station 220, may have two antennas for receiving frequencies and one antenna for transmitting frequency. The two antennas for receiving frequencies may be used on the receive side so that the base station 220 may compare signals and select a better antenna for each wireless communication device, for example, wireless communication device 230 within the mobile radio cell, for example, mobile radio cell 210. This may also be referred to as diversity reception. The one antenna for transmitting frequency may be used on the transmit side. Other antenna or frequency configurations of base stations may also apply.

Figure 3A:
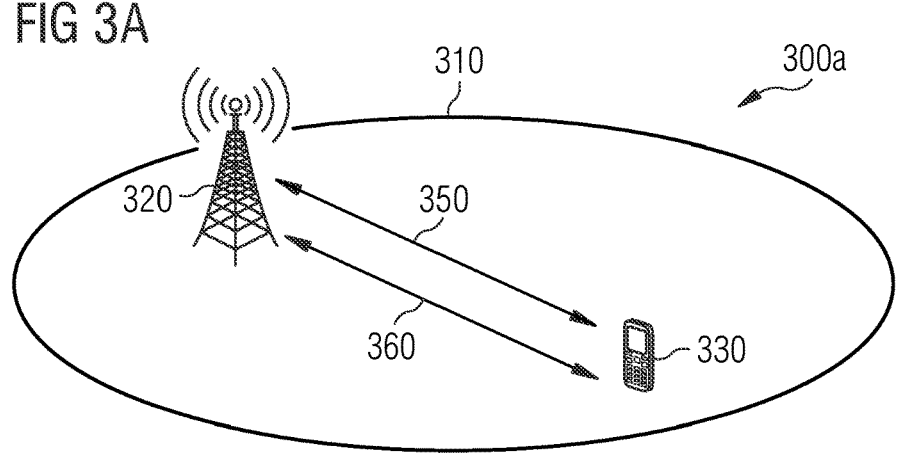
FIGS. 3a and 3b show an exemplary scenario of a wireless communication device including slots for two SIM cards within a wireless communication system capable of plurality of SIM awareness in accordance with some embodiments.
Figure 3B:
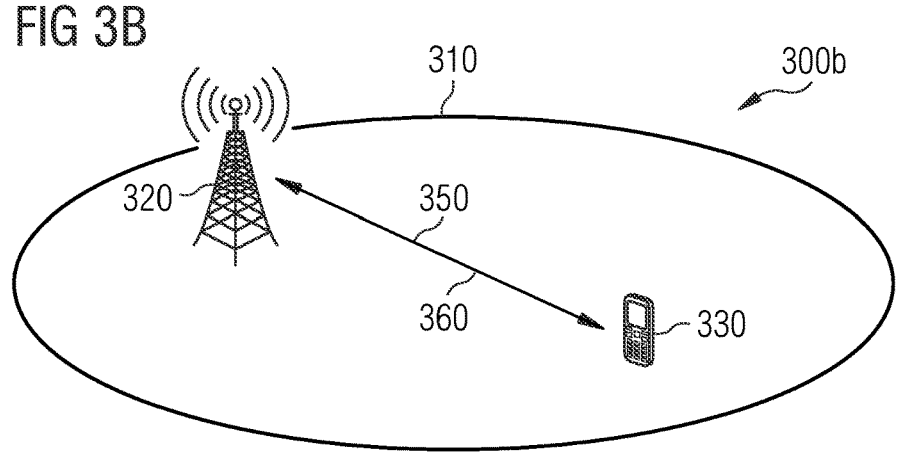

As shown in FIG. 3a, in certain Carrier Aggregation deployments, two SIM cards, for example, a first SIM card 350 and a second SIM card 360 located in a wireless communication device, for example, wireless communication device 330, may be connected to one and the same base station, for example, base station 320, but be on two different frequencies, for example, a first frequency F1 and a second frequency F2, as primary frequencies within the base station 320. With the knowledge of the two SIM cards 350 and 360 located in the same wireless communication device 330, the base station 320 may be able to move the two SIM cards 350 and 360 to a same frequency. As shown in FIG. 3b, for example, the two SIM cards 350 and 360 may be moved to the frequency F1 by the base station 320. This may allow the wireless communication device 330 where the two SIM cards 350 and 360 are located, to conduct common measurements, instead of independent measurements for each of the SIM cards 350 and 360. This may result in power saving at the wireless communication device 330 side.

Referring back to FIG. 2, in some embodiments, a wireless communication device, for example, wireless communication device 230, with slots for two SIM cards, for example, SIM cards 250 and 260, may conduct common measurements for the two SIM cards 250 and 260 without assistance of a base station, for example, base station 220. For example, the physical module of the wireless communication device 230 may conduct common measurements of neighbor cells for handovers, for reselections, or for redirections, measurements of serving cells for RLM, measurements of locations for location based services, measurements of CSI for link adaption in downlink transmission, measurements for cell search and decoding of MIB and SIBs for PLMN search, etc. Common measurements for other necessary parameters may also be conducted by the wireless communication device 230. The common measurements may be used for both of the SIM cards 250 and 260, and reported for both of the SIM cards 250 and 260 separately. Power may be saved at the wireless communication device 230 side through the common measurements for both of the SIM cards 250 and 260.

As described, the wireless communication device 230 may include a receiver to conduct all measurements, for example, in response to a command of the base station 220. The wireless communication device 230 may also include a processor to conduct measurements on signals received, to utilize the measurements conducted on signals that correspond to one SIM card, for example, SIM card 250, for the other SIM cards, for example, SIM card 260, and to generate measurement reports. The wireless communication device 230 may, for example, include one or more memories to store all measurement results. The wireless communication device 230 may include a transmitter to send the measurement reports to the base station 220.

However, performance at the wireless communication device 230 side and at the base station 220 side may be further and more greatly improved with assistance of the base station 220, for example, with base station 220's awareness of plurality of SIM cards 250 and 260 within the wireless communication device 230. In some embodiments, the base station 220 may configure measurements for one SIM card, for example, SIM card 250 or 260, and internally duplicate the measurements for the other SIM card, for example, SIM card 260 or 250. This may avoid duplicated usage of air resources for transmission reports of measurements from the wireless communication device 230 to the base station 220.

For example, the base station 220 may synchronize configurations including different DRX cycles of the two SIM cards 250 and 260, different paging cycles of the two SIM cards 250 and 260, or different average parameters of the two SIM cards 250 and 260. Furthermore, the base station 220 may avoid uncoordinated requests towards the wireless communication device 230 so that duplicated measurements at the wireless communication device 230 side may be avoided. For example, the uncoordinated requests may include requests for measurements of neighbor cells for handovers, for reselections, or for redirections, measurements of serving cells for RLM, measurements of locations for location based services, measurements of CSI for link adaption in downlink transmission, measurements for cell search and decoding of MIB and SIBs for PLMN search, etc.

As described, methods and devices for performance improvement with plurality of SIM awareness may exhibit a number of basic principles. A first principle may include two SIM cards, for example, SIM cards 250 and 260 from a same operator, or in roaming scenarios when the Visited PLMN (VPLMN) is the same. For example, the two SIM cards 250 and 260 may be connected to a same base station, for example, base station 220, if both of the SIM cards 250 and 260 belong to a same operator. For example, a wireless communication device, for example, wireless communication device 230, may be roaming, and VPLMN which two SIM cards 250 and 260 of the wireless communication device 230 select may be the same. A second principle may include the base station 220 obtaining information of two SIM cards 250 and 260 located in the same wireless communication device 230 through processing signals received, or through a signaling from the wireless communication device 230, or through information obtained from HSS. A third principle may include the base station 220 requesting to implement a series of procedures at the wireless communication device 230 side to improve performance of the wireless communication device 230 as well as performance of the base station 220 based on the knowledge of plurality of SIM cards 250 and 260 within one wireless communication device 230. The performance improvement with awareness of plurality of SIM cards may also apply in other scenarios.

Components of the wireless communication device, for example, transmitter, receiver, transceiver, processor, memory, antennas, and wired connections may for example be implemented by one or more circuitries.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 4:
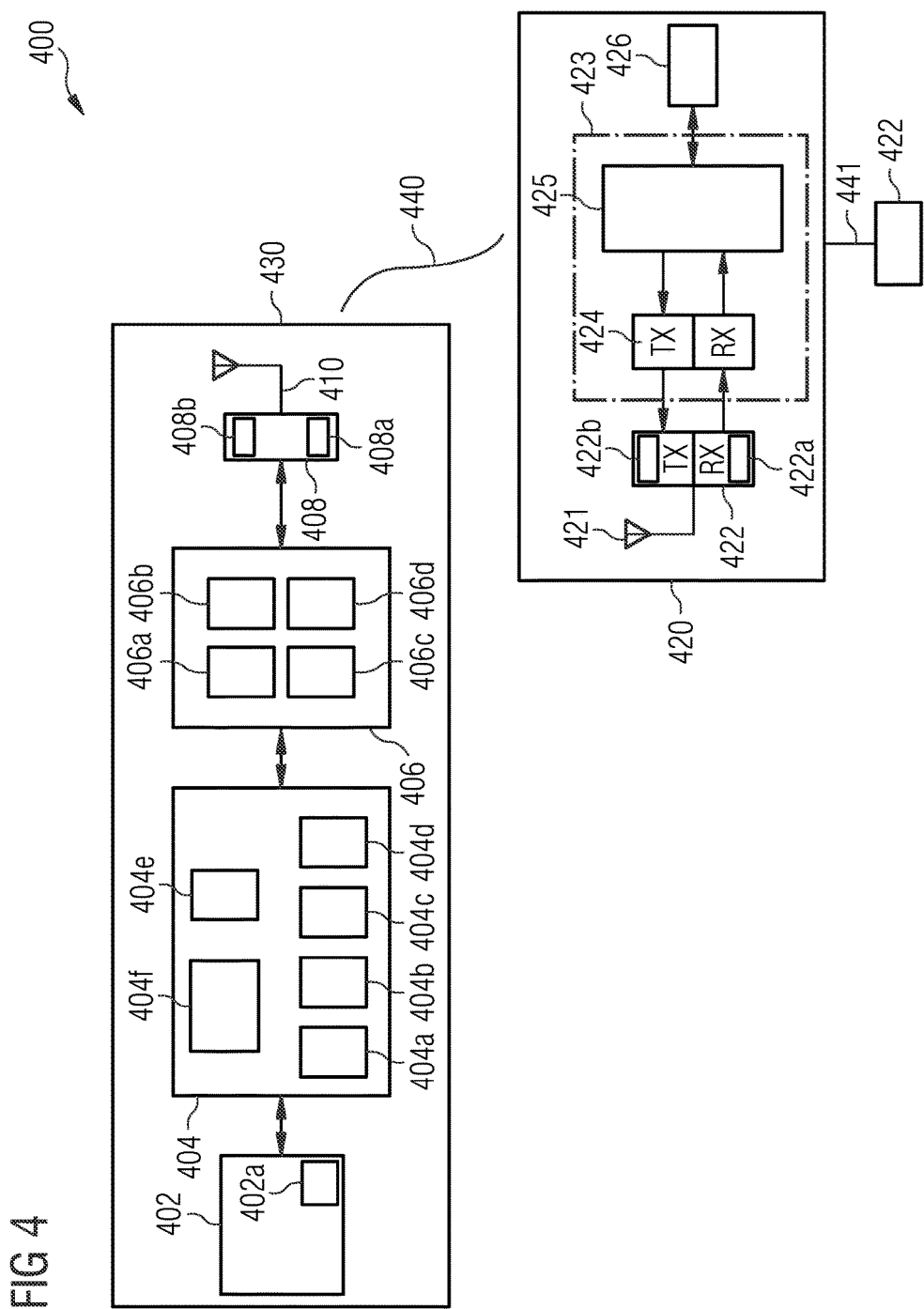
FIG. 4 shows an exemplary wireless communication device communicating with an exemplary base station of a mobile radio cell of a wireless communication system in accordance with some embodiments.

Embodiments described herein may be implemented into a system using any suitably configured hardware and/or software. FIG. 4 illustrates, for one embodiment 400, example components of a wireless communication device 430, and example components of a base station 420 of a mobile cell of a wireless communication system. In some embodiments, the wireless communication device 430 may include application circuitry 402, baseband circuitry 404, Radio Frequency (RF) circuitry 406, Front-End Module (FEM) circuitry 408 and one or more antennas 410, coupled together at least as shown.

The application circuitry 402 may include one or more application processors. For example, the application circuitry 402 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The application circuitry 402 may include one or more memories, for example, memory 402a for storing all measurement results that the wireless communication device 430 conducts on signals received. The memory 402a may also store, for example, information of wireless communication device identification, radio access network registration status, or other critical wireless communication device information and radio access network information, etc.

The baseband circuitry 404 may include circuitry such as, but not limited to, one or more single-core or multi-core processors. The baseband circuitry 404 may include one or more baseband processors and/or control logic to process baseband signals received from a receive signal path of the RF circuitry 406 and to generate baseband signals for a transmit signal path of the RF circuitry 406. Baseband processing circuitry 404 may interface with the application circuitry 402 for generation and processing of the baseband signals and for controlling operations of the RF circuitry 406. For example, in some embodiments, the baseband circuitry 404 may include a second generation (2G) baseband processor 404a, third generation (3G) baseband processor 404b, fourth generation (4G) baseband processor 404c, and/or other baseband processor(s) 404d for other existing generations, generations in development or to be developed in the future (e.g., fifth generation (5G), 6G, etc.). The baseband circuitry 404 (e.g., one or more of baseband processors 404a-d) may handle various radio control functions that enable communication with one or more radio networks via the RF circuitry 406. The radio control functions may include, but are not limited to, signal modulation/demodulation, encoding/decoding, radio frequency shifting, etc. In some embodiments, modulation/demodulation circuitry of the baseband circuitry 404 may include Fast-Fourier Transform (FFT), precoding, and/or constellation mapping/demapping functionality. In some embodiments, encoding/decoding circuitry of the baseband circuitry 404 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 404 may include elements of a protocol stack such as, for example, elements of an Evolved Universal Terrestrial Radio Access Network (EUTRAN) protocol including, for example, physical (PHY), Media Access Control (MAC), Radio Link Control (RLC), Packet Data Convergence Protocol (PDCP), and/or Radio Resource Control (RRC) elements. A Central Processing Unit (CPU) 404e of the baseband circuitry 404 may be configured to run elements of the protocol stack for signaling of the PHY, MAC, RLC, PDCP and/or RRC layers. In some embodiments, the baseband circuitry may include one or more audio Digital Signal Processor(s) (DSP) 404f. The audio DSP(s) 404f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 404 and the application circuitry 402 may be implemented together such as, for example, on a System on a Chip (SoC).

In some embodiments, CPU 404e may also be referred to as a processor. The processor 404e may, for example, conduct measurements on signals that the wireless communication device 430 receives. The processor 404e may, for example, utilize measurements conducted on signals that correspond to one SIM card, for example, SIM card 250 illustrated by FIG. 2, for the other SIM cards, for example, SIM card 260 illustrated by FIG. 2. The processor 404e may further, for example, generate measurement reports for the SIM cards that are located within the wireless communication device 430. For example, the processor 404e may generate a first measurement report for the SIM card 250, and generate a second measurement report for the SIM card 260.

In some embodiments, the baseband circuitry 404 may provide for communication compatible with one or more radio technologies. For example, in some embodiments, the baseband circuitry 404 may support communication with an Evolved Universal Terrestrial Radio Access Network (EU-TRAN) and/or other Wireless Metropolitan Area Networks (WMAN), a Wireless Local Area Network (WLAN), a Wireless Personal Area Network (WPAN). Embodiments in which the baseband circuitry 404 is configured to support radio communications of more than one wireless protocol may be referred to as multi-mode baseband circuitry.

RF circuitry 406 may enable communication with wireless networks using modulated electromagnetic radiation through a non-solid medium. In various embodiments, the RF circuitry 406 may include switches, filters, amplifiers, etc. to facilitate the communication with the wireless network. RF circuitry 406 may include a receive signal path which may include circuitry to down-convert RF signals received from the FEM circuitry 408 and provide baseband signals to the baseband circuitry 404. RF circuitry 406 may also include a transmit signal path which may include circuitry to up-convert baseband signals provided by the baseband circuitry 404 and provide RF output signals to the FEM circuitry 408 for transmission.

In some embodiments, the RF circuitry 406 may include a receive signal path and a transmit signal path. The receive signal path of the RF circuitry 406 may include mixer circuitry 406a, amplifier circuitry 406b and filter circuitry 406c. The transmit signal path of the RF circuitry 406 may include filter circuitry 406c and mixer circuitry 406a. RF circuitry 406 may also include synthesizer circuitry 406d for synthesizing a frequency for use by the mixer circuitry 406a of the receive signal path and the transmit signal path. In some embodiments, the mixer circuitry 406a of the receive signal path may be configured to down-convert RF signals received from the FEM circuitry 408 based on the synthesized frequency provided by synthesizer circuitry 406d. The amplifier circuitry 406b may be configured to amplify the down-converted signals and the filter circuitry 406c may be a Low-Pass Filter (LPF) or Band-Pass Filter (BPF) configured to remove unwanted signals from the down-converted signals to generate output baseband signals. Output baseband signals may be provided to the baseband circuitry 404 for further processing. In some embodiments, the output baseband signals may be zero-frequency baseband signals, although this is not a requirement. In some embodiments, mixer circuitry 406a of the receive signal path may comprise passive mixers, although the scope of the embodiments is not limited in this respect.

In some embodiments, the mixer circuitry 406a of the transmit signal path may be configured to up-convert input baseband signals based on the synthesized frequency provided by the synthesizer circuitry 406d to generate RF output signals for the FEM circuitry 408. The baseband signals may be provided by the baseband circuitry 404 and may be filtered by filter circuitry 406c. The filter circuitry 406c may include a Low-Pass Filter (LPF), although the scope of the embodiments is not limited in this respect.

In some embodiments, the mixer circuitry 406a of the receive signal path and the mixer circuitry 406a of the transmit signal path may include two or more mixers and may be arranged for quadrature downconversion and/or upconversion respectively. In some embodiments, the mixer circuitry 406a of the receive signal path and the mixer circuitry 406a of the transmit signal path may include two or more mixers and may be arranged for image rejection (e.g., Hartley image rejection). In some embodiments, the mixer circuitry 406a of the receive signal path and the mixer circuitry 406a may be arranged for direct downconversion and/or direct upconversion, respectively. In some embodiments, the mixer circuitry 406a of the receive signal path and the mixer circuitry 406a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 406 may include Analog-to-Digital Converter (ADC) and Digital-to-Analog Converter (DAC) circuitry and the baseband circuitry 404 may include a digital baseband interface to communicate with the RF circuitry 406.

In some dual-mode embodiments, a separate radio IC circuitry may be provided for processing signals for each spectrum, although the scope of the embodiments is not limited in this respect.

In some embodiments, the synthesizer circuitry 406d may be a fractional-N synthesizer or a fractional N/N+1 synthesizer, although the scope of the embodiments is not limited in this respect as other types of frequency synthesizers may be suitable. For example, synthesizer circuitry 406d may be a delta-sigma synthesizer, a frequency multiplier, or a synthesizer comprising a phase-locked loop with a frequency divider.

The synthesizer circuitry 406d may be configured to synthesize an output frequency for use by the mixer circuitry 406a of the RF circuitry 406 based on a frequency input and a divider control input. In some embodiments, the synthesizer circuitry 406d may be a fractional N/N+1 synthesizer.

In some embodiments, frequency input may be provided by a Voltage Controlled Oscillator (VCO), although that is not a requirement. Divider control input may be provided by either the baseband circuitry 404 or the applications processor 402 depending on the desired output frequency. In some embodiments, a divider control input (e.g., N) may be determined from a look-up table based on a channel indicated by the applications processor 402.

Synthesizer circuitry 406d of the RF circuitry 406 may include a divider, a Delay-Locked Loop (DLL), a multiplexer and a phase accumulator. In some embodiments, the divider may be a Dual Modulus Divider (DMD) and the phase accumulator may be a Digital Phase Accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 406*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 406 may include an IQ/polar converter.

FEM circuitry 408 may include a receive signal path which may include circuitry configured to operate on RF signals received from one or more antennas 410, amplify the received signals and provide the amplified versions of the received signals to the RF circuitry 406 for further processing. FEM circuitry 408 may also include a transmit signal path which may include circuitry configured to amplify signals for transmission provided by the RF circuitry 406 for transmission by one or more of the one or more antennas 410.

In some embodiments, the FEM circuitry 408 may include a TX/RX switch to switch between transmit mode and receive mode operation. The FEM circuitry may include a receive signal path and a transmit signal path. The receive signal path of the FEM circuitry may include a Low-Noise Amplifier (LNA) to amplify received RF signals and provide the amplified received RF signals as an output (e.g., to the RF circuitry 406). The transmit signal path of the FEM circuitry 408 may include a Power Amplifier (PA) to amplify input RF signals (e.g., provided by RF circuitry 406), and one or more filters to generate RF signals for subsequent transmission (e.g., by one or more of the one or more antennas 410).

In some embodiments, the FEM circuitry 408 may include one or more receivers, for example, receiver 408*a* for receiving radio signals and/or data such as phone call signals, video data via a channel, for example, a channel 440. The receiver 408*a* may further conduct all measurements on the radio signals received, for example, in response to a command of the base station 420. The FEM circuitry 408 may also include one or more transmitters, for example, transmitter 408*b* for transmitting radio signals to one or more radio access networks through a plurality of base stations, for example, base station 420 via channel 440. The radio signals may include results of measurements. The radio signals may also include other critical information of the wireless communication device 430, and information of radio access networks, etc. In some embodiments, the transmitter 408*b* may send the explicit signaling to the base station 420 via channel 440 to information the base station 420 about the one or more SIM cards that are located in the wireless communication device 430.

In some embodiments, the wireless communication device 430 may include additional elements such as, for example, memory/storage, display, camera, sensor, and/or Input/Output (I/O) interface.

In some embodiments, the base station 420 of a mobile radio cell of a wireless communication system may include a plurality of antennas, or a plurality of antenna arrays, for example, antenna 421. The base station may include one or more receivers, for example, receiver 422*a* to receive a plurality of measurement reports from n wireless communication devices (n≥1, with n being an integer), for example, wireless communication device 430 via channel 440. The base station 420 may include one or more transmitters, for example, transmitter 422*b* to send configurations to the wireless communication device 430 over the air. The base station 420 may include one or more RF circuitries, for example, RF circuitry 424 for a receive signal path and a transmit signal path. The base station 420 may further include one or more baseband modems, for example, baseband modem 423 to direct communication functionality of the base station 420 according to communication protocols associated with each radio access network, to execute control over the plurality of antennas, or the plurality of antenna arrays, for example, antenna 421, and control of the one or more receivers, for example, receiver 422*a*, or the one or more transmitters, for example, transmitter 422*b*. In some embodiments, the base station 420 may include one or more processors, for example, processor 425 for processing the radio signals received. For example, the processor 425 may decode the plurality of measurement reports received. The processor 425 may determine whether at least two measurement reports of the plurality of the measurement reports are associated with two SIM cards that are located in one and the same wireless communication device, for example, wireless communication device 430. In some embodiments, the base station 420 may include one or more memories, for example, memory 426 to store the received measurement reports. The memory 426 may further store information of previous correlations on a database.

In some embodiments, the base station 420 may include wired connections, for example, a wired connection 441 to receive messages from the HSS. The wired connections may include fiber optics cables of an Ethernet link. Other wired connections may be also used. The wired connection 441 may be coupled to an interface controller, for example, interface controller 442, and controlled by the interface controller 442. The interface controller 442 may be, for example, an Ethernet controller. Other interface controllers may also apply to control wired communications.

As illustrated by FIG. 2, a wireless communication device 230 with slots for a plurality of SIM cards, for example, with slots for a first SIM card 250 and a second SIM card 260, is located in a mobile radio cell 210 for which a base station 220 provides radio coverage. The wireless communication device 230 may be a UE, a mobile device, a receiver, a transmitter, a transceiver or a MS. The mobile radio cell 210 is one of the mobile radio cells of a wireless communication system, for example, wireless communication system 100 illustrated by FIG. 1. The wireless communication system 100 may apply GSM, EDGE, UMTS, LTE, or 5G communication standards. As described, the wireless communication device 230 with slots for two SIM cards 250 and 260 may connect to a one and the same base station 220. For example, the two SIM cards 250 and 260 may connect to a one and the same operator. For example, the wireless communication device 230 may be roaming, and even though the two SIM cards 250 and 260 have different Home PLMN, they may have the same VPLMN. For example, the operator for the two SIM cards 250 and 260 may share the same base station, for example, base station 220.

FIG. 5 shows a flow diagram 500 depicting an example method for improving performance with awareness of plurality of SIM cards for a base station of a wireless communication system and a wireless communication device including slots for two SIM cards within the system.

In 510, the wireless communication device 230 with slots for two SIM cards 250 and 260 conducts a plurality of measurements defined by 3GPP. The measurements may be conducted upon the initiative of the wireless communication device 230 or in response to a command of the base station 220 within the mobile radio cell 210 of the wireless communication system 100 illustrated by FIG. 1. The wireless communication device 230 may be able to conduct common measurements of the plurality of measurements for both of the SIM cards 250 and 260. The common measurements of the plurality of measurements include measurements of neighbor cells for handovers, for reselections, or for redirections, measurements of serving cells for RLM, measurements of locations for location based services, measurements of CSI for link adaption in downlink transmission, measurements for cell search and decoding of MIB and SIBs for PLMN search, etc.

In 520, the wireless communication device 230 sends reports of results of the measurements of the two SIM cards 250 and 260 to the base station 220 within the mobile radio cell 210 of the wireless communication system 100 illustrated by FIG. 1.

In 530, the base station 220 within the mobile radio cell 210 of the wireless communication system 100 illustrated by FIG. 1 receives reports of measurements of SIM cards from n UEs (n≥1, with n being an integer), including, for example, the reports of the results of the measurements of the two SIM cards 250 and 260.

In 540, the base station 220 within the mobile radio cell 210 of the wireless communication system 100 illustrated by FIG. 1 processes the reports of the results of the measurements, including, for example, the reports of the results of the measurements of the two SIM cards 250 and 260.

In 550, the base station 220 within the mobile radio cell 210 of the wireless communication system 100 illustrated by FIG. 1 correlates the reports of the results of the measurements of the two SIM cards 250 and 260, for example, correlates the two SIM cards 250 and 260, if feedback of the process is positive.

FIG. 6 shows a flow diagram 600 depicting an example method for improving performance through a base station of a mobile radio cell of a wireless communication system communicating with a wireless communication device including slots for two SIM cards in accordance with some embodiments.

In 610, the base station 220 within the mobile radio cell 210 of the wireless communication system 100 illustrated by FIG. 1 receives reports of measurements of SIM cards from n UEs (n≥1, with n being an integer), including, for example, reports of measurements of the two SIM cards 250 and 260.

In 620, the base station 220 within the mobile radio cell 210 of the wireless communication system 100 illustrated by FIG. 1 processes the reports of the measurements, including, for example, the reports of the measurements of the two SIM cards 250 and 260.

In 630, the base station 220 within the mobile radio cell 210 of the wireless communication system 100 illustrated by FIG. 1 correlates the reports of the measurements of the two SIM cards 250 and 260, for example, correlates the two SIM cards 250 and 260, if feedback of the process is positive.

In 640, the base station 220 within the mobile radio cell 210 of the wireless communication system 100 illustrated by FIG. 1 stores information of the correlated two SIM cards 250 and 260 on a database on a memory.

FIG. 7 shows a flow diagram 700 depicting a second example method for improving performance through a base station of a mobile radio cell of a wireless communication system communicating with a wireless communication device including slots for two SIM cards in accordance with some embodiments.

In 710, the base station 220 within the mobile radio cell 210 of the wireless communication system 100 illustrated by FIG. 1 receives reports of measurements of SIM cards from n UEs (n≥1, with n being an integer), including, for example, reports of measurements of two SIM cards 250 and 260.

In 720, the base station 220 within the mobile radio cell 210 of the wireless communication system 100 illustrated by FIG. 1 monitors a number of parameters and/or procedures with reference to a set of thresholds. Based on results of the monitoring, the base station 220 determines as to whether to correct a correlation made for SIM cards, for example, the two SIM cards 250 and 260 that are located in one and the same wireless communication device 230. The monitored parameters and/or procedures may include packet error, and handover failures. The set of thresholds may include a pre-defined threshold.

In 730, the base station 220 within the mobile radio cell 210 of the wireless communication system 100 illustrated by FIG. 1 processes the reports of the measurements, including, for example, the reports of the measurements of the two SIM cards 250 and 260 from the wireless communication device 230 if it determines that the correlation made for the two SIM cards 250 and 260 that are located in one and the same wireless communication device 230 is invalid.

In 740, the base station 220 within the mobile radio cell 210 of the wireless communication system 100 illustrated by FIG. 1 updates information of the correlated two SIM cards 250 and 260 on a database on a memory.

FIG. 8 shows a flow diagram 800 depicting an example of a base station of a mobile radio cell of a wireless communication system communicating with a wireless communication device including slots for two SIM cards in accordance with some embodiments.

In 810, the base station 220 within the mobile radio cell 210 of the wireless communication system 100 illustrated by FIG. 1 receives reports of measurements of SIM cards from n UEs (n≥1, with n being an integer), including, for example, reports of measurements of the two SIM cards 250 and 260.

In 820, the base station 220 within the mobile radio cell 210 of the wireless communication system 100 illustrated by FIG. 1 scans any reported measurements that belong to a same type.

In 830, the base station 220 within the mobile radio cell 210 of the wireless communication system 100 illustrated by FIG. 1 checks any reported measurements of the same type are reported within a time separation. The time separation may be a pre-defined threshold.

In 840, the base station 220 within the mobile radio cell 210 of the wireless communication system 100 illustrated by FIG. 1 correlates reports of measurements of SIM cards, for example, correlates or pairs reports of measurements of SIM cards 250 and 260.

In 850, the base station 220 within the mobile radio cell 210 of the wireless communication system 100 illustrated by FIG. 1 stores information of correlated SIM cards, for example, the correlated two SIM cards 250 and 260 on a database on a memory.

FIG. 9 shows a flow diagram 900 depicting an example method for improving performance through information provided to a wireless communication system communicating with a wireless communication device including slots for two SIM cards in accordance with some embodiments.

In 910, the base station 220 within the mobile radio cell 210 of the wireless communication system 100 illustrated by FIG. 1 may receive information, from the wireless communication device 230 through signaling, about two SIM cards 250 and 260 located in the wireless communication device 230.

In 920, the base station 220 within the mobile radio cell 210 of the wireless communication system 100 illustrated by FIG. 1 receives reports of measurements of the two SIM cards 250 and 260 from the wireless communication device 230.

In 930, the base station 220 within the mobile radio cell 210 of the wireless communication system 100 illustrated by FIG. 1 correlates the reports of the measurements of the two SIM cards 250 and 260 from the wireless communication device 230.

In 940, the base station 220 within the mobile radio cell 210 of the wireless communication system 100 illustrated by FIG. 1 stores information of correlated SIM cards, for example, the correlated two SIM cards 250 and 260 on a database on a memory.

FIG. 10 shows a flow diagram 1000 depicting a second example method for improving performance through information provided to a wireless communication system communicating with a wireless communication device including slots for two SIM cards in accordance with some embodiments.

In 1010, the base station 220 within the mobile radio cell 210 of the wireless communication system 100 illustrated by FIG. 1 may receive information about a plurality of SIM cards, for example, information about two SIM cards 250 and 260 located in the wireless communication device 230 by a HSS.

In 1020, the base station 220 within the mobile radio cell 210 of the wireless communication system 100 illustrated by FIG. 1 receives reports of measurements of the two SIM cards 250 and 260 from the wireless communication device 230.

In 1030, the base station 220 within the mobile radio cell 210 of the wireless communication system 100 illustrated by FIG. 1 correlates the reports of the measurements of the two SIM cards 250 and 260 from the wireless communication device 230.

In 1040, the base station 220 stores information of correlated SIM cards, for example, the correlated two SIM cards 250 and 260 on a database on a memory.

FIG. 11 shows a flow diagram 1100 depicting an example method for improving performance with assistance of a wireless communication device including slots for two SIM cards in accordance with some embodiments.

In 1110, the wireless communication device 230, for example, with slots for two SIM cards 250 and 260 conducts common measurements of a plurality of measurements for both of the SIM cards 250 and 260. The plurality of measurements may be defined by 3GPP. The common measurements of the plurality of measurements include common measurements of neighbor cells for handovers, for reselections, or for redirections, measurements of serving cells for RLM, measurements of locations for location based services, measurements of CSI for link adaption in downlink transmission, measurements for cell search and decoding of MIB and SIBs for PLMN search, etc.

In 1120, the wireless communication device 230 with slots for two SIM cards 250 and 260 utilizes results of the common measurements for both of the SIM cards 250 and 260, and sends reports of the results of the common measurements for both of the SIM cards 250 and 260 separately to the base station 220 within the mobile radio cell 210 of the wireless communication system 100 illustrated by FIG. 1.

The following examples pertain to further embodiments.

Example 1 is a method for improving performance of a wireless communication system illustrated by FIG. 6.

In Example 2, the subject matter of Example 1 may optionally include storing information of the correlated second set of reports on a database.

In Example 3, the subject matter of Example 2 may optionally include the database being located on a memory of the wireless communication system.

In Example 4, the subject matter of any one of Examples 1-3 may optionally include the correlating the second set of reports including correlating Subscriber Identity Module (SIM) cards that are associated with the correlated second set of reports.

In Example 5, the subject matter of any one of Examples 1-4 may optionally include the correlated second set of reports comprising location update reports, channel station information reports, or radio resource control reports.

In Example 6, the subject matter of any one of Examples 1-5 may optionally include a number of the plurality of measurement reports being larger than a number of the plurality of wireless communication devices.

In Example 7, the subject matter of any one of Examples 1-6 may optionally include the wireless communication system being a Global System for Mobile Communications (GSM), an Enhanced Data Rates for GSM Evolution (EDGE), a Universal Mobile Communication System (UMTS), a Long Term Evolution (LTE), or a $5^{th}$ Generation (5G) wireless communication system.

In Example 8, the subject matter of any one of Examples 1-7 may optionally include monitoring parameters with thresholds to determine whether the correlating the second set of reports is valid.

In Example 9, the subject matter of Example 8 may optionally include correcting the correlating the second set of reports if the correlating the second set of reports is invalid.

In Example 10, the subject matter of Example 9 may optionally include updating information of the correlated second set of reports with the corrected correlating the second set of reports on a database.

In Example 11, the subject matter of any one of Examples 8-10 may optionally include the parameters including packet errors.

In Example 12, the subject matter of any one of Examples 8-11 may optionally include the parameters including handover failures.

Example 13 is a apparatus of a wireless communication system may optionally include a receiver to receive a plurality of measurement reports from a plurality of wireless communication devices of the wireless communication system, one or more processors, and a memory to store recorded instructions thereon which, when executed by the one or more processors, make the one or more processors scan the plurality of measurement reports to identify a first set of reports that are of a same type, and check the first set of reports to identify a second set of reports that are within a time separation less than a pre-defined threshold.

In Example 14, the subject matter of Examples 13 may optionally include the one or more processors being further made to correlate the second set of reports that are identified to be within the time separation that is less than the pre-defined threshold.

In Example 15, the subject matter of any one of Examples 13-14 may optionally include the one or more processors being further made to correct the correlation of the second set of reports through monitoring parameters with thresholds.

In Example 16, the subject matter of any one of Examples 13-15 may optionally include the one or more processors being further made to update information of the correlated second set of reports that is stored on a database with the corrected correlation of the second set of reports.

Example 17 is a device for improving performance of wireless communications illustrated by FIG. 5.

In Example 18, the subject matter of Example 17 may optionally include a memory to store information of the at least two correlated measurement reports.

In Example 19, the subject matter of any one of Examples 17-18 may optionally include the one or more processors further to scan the plurality of measurement reports to identify a first set of reports that are of a same type.

In Example 20, the subject matter of any one of Examples 17-19 may optionally include the one or more processors further to check the first set of reports to identify a second set of reports that are within a time separation less than a pre-defined threshold.

In Example 21, the subject matter of any one of Examples 17-20 may optionally include the at least two correlated measurement reports comprising location update reports, channel station information reports, or radio resource control reports.

In Example 22, the subject matter of any one of Examples 17-21 may optionally include the one or more processors further to coordinate requests for the at least two SIM cards located within the individual wireless communication device of the plurality of wireless communication devices of the wireless communication system.

In Example 23, the subject matter of Example 22 may optionally include the coordinated requests including alignments of paging cycles in Idle state of Radio Resource Control (RRC).

In Example 24, the subject matter of Example 22 may optionally include the coordinated request including alignments of Discontinuous Reception mode (DRX) in a connected state of Radio Resource Control (RRC).

In Example 25, the subject matter of Example 22 may optionally include the coordinated requests including synchronizations of handovers.

In Example 26, the subject matter of Example 22 may optionally include the coordinated requests including common measurements of neighbor cells for handovers, for reselections, or for redirections, measurements of serving cells for Radio Link Monitoring (RLM), measurements of locations for location based services, measurements of Channel State Information (CSI) for link adaption in downlink transmission.

In Example 27, the subject matter of any one of Examples 22-26 may optionally include a transmitter to send the coordinated requests to the individual wireless communication device of the plurality of wireless communication devices of the wireless communication system.

In Example 28, the subject matter of any one of Examples 17-27 may optionally include the one or more processors further to move the at least two SIM cards located within the individual wireless communication device to a same frequency for Carrier Aggregation deployments.

In Example 29, the subject matter of any one of Examples 17-28 may optionally include a number of the plurality of measurement reports being larger than a number of the plurality of wireless communication devices.

Example 30 is an apparatus for improving performance of wireless communications illustrated by FIG. 7.

In Example 31, the subject matter of Example 30 may optionally include the processing module further to monitor parameters with thresholds to determine whether the correlated measurement reports of the plurality of measurement reports are valid.

In Example 32, the subject matter of Example 31 may optionally include the parameters including packet errors.

In Example 33, the subject matter of any one of Examples 31-32 may optionally include the parameters including handover failures.

In Example 34, the subject matter of any one of Examples 30-33 may optionally include the processing module correcting of the correlated measurement reports comprising scanning the plurality of measurement reports to identify a first set of reports that are of a same type.

In Example 35, the subject matter of any one of Examples 30-34 may optionally include the processing module correcting of the correlated measurement reports further comprising checking the first set of measurement reports to identify a second set of reports that are within a time separation less than a pre-defined threshold.

In Example 36, the subject matter of any one of Examples 30-35 may optionally include the correlated measurement reports comprising location update reports, channel station information reports, or radio resource control reports.

In Example 37, the subject matter of any one of Examples 30-36 may optionally include the processing module further to update information of the correlated measurement reports that is stored on a memory of the apparatus with the corrected correlated measurement reports.

Example 38 is a processor for an apparatus to identify a plurality of Subscriber Identity Module (SIM) cards within a wireless communication device illustrated by FIG. 8.

In Example 39, the subject matter of Example 38 may optionally include further configured to store information of the correlated second set of reports on a memory of the apparatus.

In Example 40, the subject matter of Example 39 may optionally include further configured to update the information of the correlated second set of reports with the corrected correlated second set of reports on the memory of the apparatus.

In Example 41, the subject matter of any one of Examples 38-40 may optionally include the correlated second set of reports comprising location update reports, channel station information reports, or radio resource control reports.

In Example 42, the subject matter of any one of Example 38-41 may optionally include the correlation of the second set of reports including correlating Subscriber Identity Module (SIM) cards that are associated with the correlated second set of reports.

In Example 43, the subject matter of any one of Example 38-42 may optionally include the parameters including packet errors.

In Example 44, the subject matter of any one of Example 38-43 may optionally include the parameters including handover failures.

In Example 45, the subject matter of any one of Example 38-44 may optionally include a number of the plurality of measurement reports being larger than a number of the plurality of wireless communication devices.

In Example 46, the subject matter of any one of Example 38-45 may optionally include the wireless communication system being a Global System for Mobile Communications (GSM), an Enhanced Data Rates for GSM Evolution (EDGE), a Universal Mobile Communication System (UMTS), a Long Term Evolution (LTE), or a 5$^{th}$ Generation (5G) wireless communication system.

Example 47 is a device for improving performance with awareness of plurality of Subscriber Identity Module (SIM) cards illustrated by FIG. 9 or FIG. 10.

Example 48 is a device for improving performance with awareness of plurality of Subscriber Identity Module (SIM) cards illustrated by FIG. 9.

Example 49 is a device for improving performance with awareness of plurality of Subscriber Identity Module (SIM) cards illustrated by FIG. 10.

In Example 50, the subject matter of Example 49 may optionally include the wired connections being fiber optics cables of an Ethernet link.

In Example 51, the subject matter of any one of Examples 47-50 may optionally include one or more processors to store the information of the plurality of SIM cards that are located within the wireless communication device of the wireless communication system on a memory of the device.

In Example 52, the subject matter of Example 51 may optionally include the stored information of the plurality of SIM cards that are located within the wireless communication device of the wireless communication system being for imminent or future wireless communications of the wireless communication system.

Example 53 is a method for a wireless communication device with slots for a plurality of Subscriber Identity Module (SIM) cards illustrated by FIG. 11.

Example 54 is a computer readable medium having recorded instructions thereon which, when executed by one or more processors, make the one or more processors perform the method according to Example 53.

Example 55 is a wireless communication device including slots for a plurality of Subscriber Identity Module (SIM) cards may optionally include a receiver to conduct common measurements on signals that correspond to one of the plurality of SIM cards, and a transmitter to report the common measurements conducted on the signals that correspond to the one of the plurality of SIM cards for a first SIM card of the plurality of SIM cards, and for a second SIM card of the plurality of SIM cards to a wireless communication system.

In Example 56, the subject matter of Example 55 may optionally include one or more memories to store the common measurements for each of the plurality of SIM cards.

In Example 57, the subject matter of any one of Examples 55-56 may optionally include one or more processors to utilize the common measurements conducted on the signals that correspond to the one of the plurality of SIM cards for all of the plurality of SIM cards.

In Example 58, the subject matter of Example 57 may optionally include the one or more processors further to generate a first report of the common measurements for a first SIM card of the plurality of SIM cards, and to generate a second report of the common measurements for a second SIM card of the plurality of SIM cards.

In Example 59, the subject matter of any one of Examples 55-58 may optionally include the common measurements including measurements of neighbor cells for handovers, for reselections, or for redirections, measurements of serving cells for Radio Link Monitoring (RLM), measurements of locations for location based services, measurements of Channel State Information (CSI) for link adaption in downlink transmission, measurements for cell search and decoding of Master Information Block (MIB) and System Information Blocks (SIBs) for Public Land Mobile Network (PLMN) search.

In Example 60, the subject matter of any one of Examples 55-59 may optionally include the wireless communication system being a Global System for Mobile Communications (GSM), an Enhanced Data Rates for GSM Evolution (EDGE), a Universal Mobile Communication System (UMTS), a Long Term Evolution (LTE), or a 5$^{th}$ Generation (5G) wireless communication system.

Example 61 is a wireless communication apparatus for a wireless communication system may optionally include a receiver to receive communication signals, one or more processors to determine, based on the communication signals, that at least two SIM cards are located in one and the same wireless communication device of the wireless communication system, and the one or more processors further to coordinate requests for the at least two SIM cards that are located in the wireless communication device.

In Example 62, the subject matter of Example 61 may optionally include the communication signals including a plurality of measurement reports from a plurality of wireless communication devices of the wireless communication system.

In Example 63, the subject matter of Example 61 may optionally include the communication signals including information of the at least two SIM cards that are located in the wireless communication device sent by the wireless communication device through signaling.

In Example 64, the subject matter of Example 61 may optionally include the communication signals including information of the at least two SIM cards that are located in the wireless communication device sent by Home Subscriber Server (HSS) through wired connections.

In Example 65, the subject matter of any one of Examples 61-64 may optionally include the coordinated requests including alignments of paging cycles in Idle state of Radio Resource Control (RRC).

In Example 66, the subject matter of any one of Examples 61-65 may optionally include the coordinated requests including alignments of Discontinuous Reception mode (DRX) in a connected state of Radio Resource Control (RRC).

In Example 67, the subject matter of any one of Examples 61-66 may optionally include the coordinated requests including synchronizations of handovers In Example 68, the subject matter of any one of Examples 61-67 may optionally include the coordinated requests including common measurements of neighbor cells for handovers, for reselections, or for redirections, measurements of serving cells for Radio Link Monitoring (RLM), measurements of locations for location based services, measurements of Channel State Information (CSI) for link adaption in downlink transmission.

In Example 69, the subject matter of any one of Examples 61-68 may optionally include the one or more processors further to move the at least two SIM cards that are located in the wireless communication device of the wireless communication system to a same frequency for Carrier Aggregation deployments.

In Example 70, the subject matter of any one of Examples 61-69 may optionally include a transmitter to transmit the coordinated requests to the wireless communication device of the wireless communication system.

It should be noted that one or more of the features of any of the examples above may be combined with any one of the other examples.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

These processes are illustrated as a collection of blocks in a logical flow graph, which represents a sequence of operations that may be implemented in mechanics alone or a combination with hardware, software, and/or firmware. In the context of software/firmware, the blocks represent instructions stored on one or more computer-readable storage media that, when executed by one or more processors, perform the recited operations.

The term "computer-readable media" includes computer-storage media. In one embodiment, computer-readable media is non-transitory. For example, computer-storage media may include, but are not limited to, magnetic storage devices (e.g., hard disk, floppy disk, and magnetic strips), optical disks (e.g., Compact Disk (CD) and Digital Versatile Disk (DVD)), smart cards, flash memory devices (e.g., thumb drive, stick, key drive, and SD cards), and volatile and non-volatile memory (e.g., Random Access Memory (RAM), Read-Only Memory (ROM)).

The invention claimed is:

1. An apparatus of a wireless communication system, comprising:
   a receiver to receive a plurality of measurement reports from a plurality of wireless communication devices of the wireless communication system; wherein one or more wireless devices comprises a first subscriber identity module (SIM) and a second SIM;
   one or more processors; and
   a memory to store recorded instructions thereon which, when executed by the one or more processors, make the one or more processors:
      scan the plurality of measurement reports to identify a first set of reports pertaining to the first SIM that are of a same type; and
      check the first set of reports to identify a second set of reports pertaining to the second SIM that are within a time separation less than a pre-defined threshold.

2. The apparatus of claim 1, wherein the one or more processors are further made to correlate the second set of reports that are identified to be within the time separation that is less than the pre-defined threshold.

3. The apparatus of claim 2, wherein the one or more processors are further made to correct the correlation of the second set of reports through monitoring parameters with thresholds.

4. An apparatus for improving performance of wireless communications, comprising:
   a receiving circuit to receive a plurality of measurement reports from a plurality of wireless communication devices of a wireless communication system;
   a processing circuit configured to:
      scan the plurality of measurement reports to identify a first set of reports that are of a same type;
      check the first set of reports to identify a second set of reports that are within a time separation less than a pre-defined threshold;
      determine validity of correlated measurement reports of the plurality of measurement reports; and
      correct one or more correlated measurement reports of the plurality of measurement reports determined to be invalid.

5. The apparatus of claim 4, wherein the processing circuit further to monitor parameters with thresholds to determine whether the correlated measurement reports of the plurality of measurement reports are valid.

6. The apparatus of claim 5, wherein the parameters include packet errors.

7. The apparatus of claim 5, wherein the parameters include handover failures.

8. The apparatus of claim 4, wherein the correlated measurement reports comprise location update reports, channel station information reports, or radio resource control reports.

9. The apparatus of claim 4, wherein the processing circuit further to update information of the correlated measurement reports that is stored on a memory of the apparatus with the corrected correlated measurement reports.

* * * * *